US009975776B2

(12) United States Patent
Lee et al.

(10) Patent No.: US 9,975,776 B2
(45) Date of Patent: May 22, 2018

(54) COMPOSITE FILM AND METHOD OF FORMING THE SAME

(71) Applicant: Nanyang Technological University, Singapore (SG)

(72) Inventors: Pooi See Lee, Singapore (SG); Afriyanti Sumboja, Singapore (SG); Ce Yao Foo, Singapore (SG)

(73) Assignee: Nanyang Technological University, Singapore (SG)

( * ) Notice: Subject to any disclaimer, the term of this patent is extended or adjusted under 35 U.S.C. 154(b) by 136 days.

(21) Appl. No.: 14/443,994

(22) PCT Filed: Nov. 13, 2013

(86) PCT No.: PCT/SG2013/000485
§ 371 (c)(1),
(2) Date: May 19, 2015

(87) PCT Pub. No.: WO2014/081387
PCT Pub. Date: May 30, 2014

(65) Prior Publication Data
US 2015/0298976 A1    Oct. 22, 2015

Related U.S. Application Data

(60) Provisional application No. 61/729,429, filed on Nov. 23, 2012.

(51) Int. Cl.
*B05D 3/04* (2006.01)
*C01B 31/04* (2006.01)
(Continued)

(52) U.S. Cl.
CPC ............ *C01B 31/043* (2013.01); *B82Y 40/00* (2013.01); *C01B 32/23* (2017.08); *C01G 31/02* (2013.01);
(Continued)

(58) Field of Classification Search
CPC .................................................... C01B 31/043
(Continued)

(56) References Cited

U.S. PATENT DOCUMENTS

2009/0235721 A1* 9/2009 Robinson ............... B82Y 20/00
73/31.05

FOREIGN PATENT DOCUMENTS

WO      2012/028964 A2    3/2012
WO   WO 2012/028964    *  3/2012  ............. B01J 20/20

OTHER PUBLICATIONS

Zhu, Nanostructured Reduced Graphene Oxide/Fe2O3 Composite As a High-Performance Anode Material for Lithium Ion Batteries, ACSNano, vol. 5 No. 4, p. 3333-3338.*
(Continued)

*Primary Examiner* — Tabatha Penny
(74) *Attorney, Agent, or Firm* — Seed IP Law Group LLP

(57) ABSTRACT

A method of forming a metal oxide/reduced graphene oxide composite film may be provided. The method may include providing a graphene oxide dispersion. The providing a graphene oxide dispersion method may also include adding a metal oxide to the graphene oxide dispersion to form a metal oxide/graphene oxide dispersion. The method may additionally include forming a metal oxide/graphene oxide film by filtering the metal oxide/graphene oxide dispersion using a directional flow directed assembly. The method may further include reducing the metal oxide/graphene oxide film using a reducing agent to form the metal oxide/reduced graphene oxide composite film.

19 Claims, 34 Drawing Sheets

(51) Int. Cl.
| | |
|---|---|
| B82Y 40/00 | (2011.01) |
| H01M 4/133 | (2010.01) |
| H01M 4/1393 | (2010.01) |
| H01M 4/131 | (2010.01) |
| H01M 4/1391 | (2010.01) |
| C01G 31/02 | (2006.01) |
| C01G 45/02 | (2006.01) |
| H01G 11/36 | (2013.01) |
| H01G 11/38 | (2013.01) |
| H01G 11/42 | (2013.01) |
| H01G 11/84 | (2013.01) |
| C01B 32/23 | (2017.01) |

(52) U.S. Cl.
CPC .............. *C01G 45/02* (2013.01); *H01G 11/36* (2013.01); *H01G 11/38* (2013.01); *H01G 11/42* (2013.01); *H01G 11/84* (2013.01); *H01M 4/131* (2013.01); *H01M 4/133* (2013.01); *H01M 4/1391* (2013.01); *H01M 4/1393* (2013.01)

(58) Field of Classification Search
USPC ........................................................ 427/337
See application file for complete search history.

(56) References Cited

OTHER PUBLICATIONS

Pei, The reduction of graphene oxide, Carbon (2011), p. 1-19.*
Bae et al., "Fiber Supercapacitors Made of Nanowire-Fiber Hybrid Structures for Wearable/Flexible Energy Storage," *Angew. Chem. Int. Ed.* 50:1683-1687, 2011.
Cao et al., "Synthesis and superior anode performance of $TiO_2$@reduced graphene oxide nanocomposites for lithium ion batteries," *Journal of Materials Chemistry* 22:9759-9766, 2012.
Chen et al., "High-Performance Nanostructured Supercapacitors on a Sponge," *Nano Letters* 11:5165-5172, 2011.
Chmiola et al., "Monolithic Carbide-Derived Carbon Films for Micro-Supercapacitors," *Science* 328:480-484, Apr. 23, 2010.
Choi et al., "Facilitated Ion Transport in All-Solid-State Flexible Supercapacitors," *ACSNano* 5(9):7205-7213, 2011.
Fan et al., "Asymmetric Supercapacitors Based on Graphene/$MnO_2$ and Activated Carbon Nanofiber Electrodes with High Power and Energy Density," *Adv. Funct. Mater.* 21:2366-2375, 2011.
Gao et al., "Direct laser writing of micro-supercapacitors on hydrated graphite oxide films," *Nature Nanotechnology* 6:496-501, Aug. 2011.
Ghosh et al., "High Pseudocapacitance from Ultrathin $V_2O_5$ Films Electrodeposited on Self-Standing Carbon-Nanofiber Paper," *Adv. Funct. Mater.* 21:2541-2547, 2011.
Hsu et al., "High-cell-voltage supercapacitor of carbon nanotube/carbon cloth operating in neutral aqueous solution," *J. Mater. Chem.* 22(8):3383-3387, 2012.
Hu et al., "Design and Tailoring of the Nanotubular Arrayed Architecture of Hydrous $RuO_2$ for Next Generation Supercapacitors," *Nano Letters* 6(12):2690-2695, 2006.
In et al., "Origami fabrication of nanostructured, three-dimensional devices: Electrochemical capacitors with carbon electrodes," *Applied Physics Letters* 88:083104, 2006, 4 pages.
Kaempgen et al., "Printable Thin Films Supercapacitors Using Single-Walled Carbon Nanotubes," *Nano Letters* 9(5):1872-1876, 2009.
Kovtyukhova et al., "Layer-by-Layer Assembly of Ultrathin Composite Films from Micron-Sized Graphite Oxide Sheets and Polycations," *Chem. Mater.* 11:771-778, 1999.
Lake et al., "Graphene metal oxide composite supercapacitor electrodes," *Journal of Vacuum Science and Technology B* 30:03D118, 2012, 7 pages.
Li et al., "Flexible graphene/$MnO_2$ composite papers for supercapacitor electrodes," *J. Mater. Chem.* 21:14706-14711, 2011.
Liu et al., "Folded Structured Graphene Paper for High Performance Electrode Materials," *Adv. Mater.* 24:1089-1094, 2012.
Niu et al., "A Leavening Strategy to Prepare Reduced Graphene Oxide Foams," *Adv. Mater.* 24:4144-4150, 2012.
Paradiso et al., "Energy Scavenging for Mobile and Wireless Electronics," *IEEE Pervasive Computing* 4(1):18-27, 2005.
Pech et al., "Ultrahigh-power micrometre-sized supercapacitors based on onion-like carbon," *Nature Nanotechnology* 5:651-654, Sep. 2010.
Wang et al., "Fabrication of Graphene/Polyaniline Composite Paper via in Situ Anodic Electropolymerization for High-Performance Flexible Electrode," *ACS Nano* 3(7):1745-1752, 2009.
Wang et al., "Flexible Pillared Graphene-Paper Electrodes for High-Performance Electrochemical Supercapacitors," *Small* 8(3):452-459, 2012.
Weng et al., "Graphene-Cellulose Paper Flexible Supercapacitors," *Adv. Energy Mater.* 1:917-922, 2011.
Wu et al., "High-Energy $MnO_2$ Nanowire/Graphene and Graphene Asymmetric Electrochemical Capacitors," *ACS Nano* 4(10):5835-5842, 2010.
Yang et al., "Bioinspired Effective Prevention of Restacking in Multilayered Graphene Films: Towards the Next Generation of High-Performance Supercapacitors," *Adv. Mater.* 23:2833-2838, 2011.
Yoo et al., "Ultrathin Planar Graphene Supercapacitors," *Nano Lett.* 11:1423-1427, 2011.
Yu et al., "Solution-Processed Graphene/$MnO_2$ Nanostructured Textiles for High-Performance Electrochemical Capacitors," *Nano Lett.* 11:2905-2911, 2011.
Yuan et al., "Flexible Solid-State Supercapacitors Based on Carbon Nanoparticles/$MnO_2$ Nanorods Hybrid Structure," *ACS Nano* 6(1):656-661, 2012.
Zhang et al., "Synthesis and Capacitive Properties of Manganese Oxide Nanosheets Dispersed on Functionalized Graphene Sheets," *The Journal of Physical Chemistry C* 11 S:6448-6454, 2011.
Zhang et al., "Graphene-metal-oxide composites for the degradation of dyes under visible light irradiation," *J. Mater. Chem.* 21:3634-3640, 2011.
Zhu et al., "Nanostructured Reduced Graphene Oxide/$Fe_2O_3$ Composite As a High-Performance Anode Material for Lithium Ion Batteries," *ACS Nano* 5(4):3333-3338, 2011.
Zhu et al., "Reduced graphene oxide/tin oxide composite as an enhanced anode material for lithium ion batteries prepared by homogenous coprecipitation," *Journal of Power Sources* 196:6473-6477, 2011.

* cited by examiner

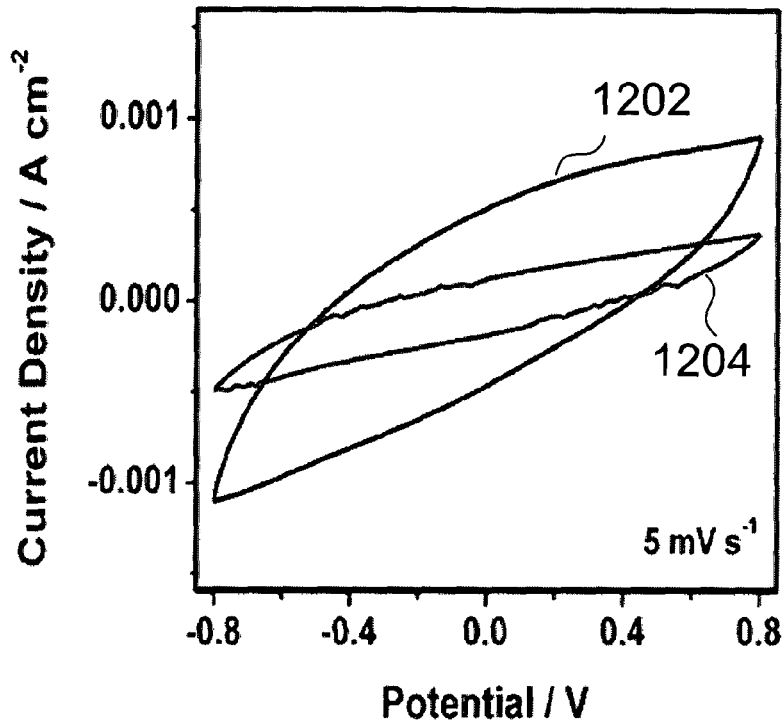
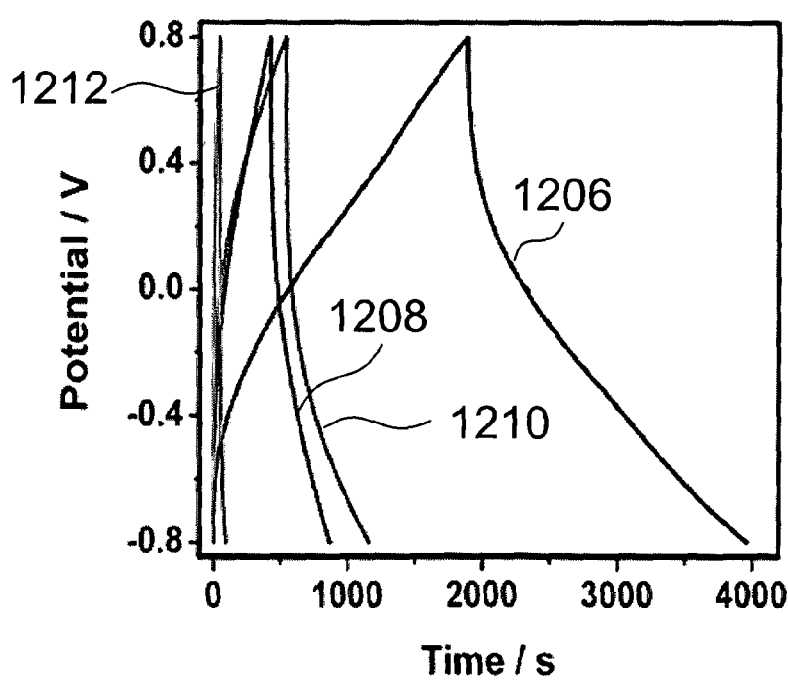

_US 9,975,776 B2_

COMPOSITE FILM AND METHOD OF FORMING THE SAME

CROSS-REFERENCE TO RELATED APPLICATION

This application claims the benefit of priority of U.S. application No. 61/729,429 filed Nov. 23, 2012, the contents of it being hereby incorporated by reference in its entirety for all purposes.

TECHNICAL FIELD

The present invention relates to composite films and methods of forming the same.

BACKGROUND

Flexible electrode materials have received great amount of interest due to their potential applications in wearable or roll up gadgets such as electronic papers, collapsible displays and other personal multimedia devices. Recent literature has introduced free standing paper carbon based electrodes that are promising for producing flexible electronic devices. Carbon nanotubes (CNT) and its composites have been extensively studied to form flexible electrodes. However, their relatively high production cost and difficulty of getting stable CNT dispersion have hindered its practical application.

Recently, graphene based electrodes have gained interest due to its remarkable mechanical and electrical properties as well as good electrochemical stability. In order to form flexible electrode, assembly of individual graphene nanosheets into a macroscopic freestanding and flexible graphene paper is of interest. Several recent reports on the freestanding graphene paper have shown good flexibility upon bending.

Flexible graphene based electrodes can be used in wide range applications such as thermoelectric, gas sensor, bio sensor, fuel cell, etc. Flexible graphene based electrodes can also be used for flexible energy storage devices such as batteries and supercapacitors. Although graphene based electrodes have been widely reported, most of the electrodes are in powder form that require metal substrates as their current collector or have a low mass ($<0.5$ mg cm$^{-2}$) leading to a low areal capacitance (mF cm$^{-2}$). High areal capacitance is crucial in miniaturization of the energy storage device for modern gadget applications. Electrodes that have high areal capacitance are able to store more charges compared to electrodes having a low areal capacitance.

Further improvement of flexible and free-standing graphene electrode is possible by incorporating pseudocapacitive materials to form flexible hybrid electrode. Among pseudocapacitive materials, ruthenium dioxide (RuO$_2$) has been well recognized due to its high specific capacitance (up to 1300 F g$^{-1}$) and good electrochemical stability. However, commercial application of RuO$_2$ has been slow due high costs of RuO$_2$. Thus, cheaper transition metal oxides, such as MnO$_2$, V$_2$O$_5$, Co$_3$O$_4$ and NiO need to be further explored as the alternative electrode materials. The areal capacitance of hybrid metal oxide/graphene based flexible electrodes is still far from satisfactory. For instance, graphene/MnO$_2$ coated on the textile has been reported with areal capacitance of 94.5 mF cm$^{-2}$ (315 F g$^{-1}$). A graphene/MnO$_2$ paper electrode without any supporting current collector (i.e. textile, sponge, foam, metallic substrates) has also been reported. However, the mass of the electrode is very low (0.07 mg cm$^{-2}$), thus the areal capacitance tends to be low, 17.9 mF cm$^{-2}$ (256 F g$^{-1}$).

SUMMARY OF THE INVENTION

In a first aspect, the present invention refers to a method of forming a metal oxide/reduced graphene oxide composite film. The method may include providing a graphene oxide dispersion. The method may also include adding a metal oxide to the graphene oxide dispersion to form a metal oxide/graphene oxide dispersion. The method may additionally include forming a metal oxide/graphene oxide film by filtering the metal oxide/graphene oxide dispersion using a directional flow directed assembly. The method may further include reducing the metal oxide/graphene oxide film using a reducing agent to form the metal oxide/reduced graphene oxide composite film.

In a second aspect, the present invention relates to a composite film. The composite film may include one or more sheets of reduced graphene oxide. The composite film may further include one or more metal oxide nanostructures attached to the one or more sheets of reduced graphene oxide.

BRIEF DESCRIPTION OF THE DRAWINGS

The invention will be better understood with reference to the detailed description when considered in conjunction with the non-limiting examples and the accompanying drawings, in which:

FIG. 12A shows the cyclic voltammograms (current density (A $cm^{-2}$) against potential (V)) of $V_2O_5$/RGO free-standing paper and RGO free-standing paper.

FIG. 12B shows the charge discharge curves (potential (V) against time (s)) of both RGO and $V_2O_5$/RGO papers at different applied currents.

DETAILED DESCRIPTION OF THE INVENTION

Figure 1:
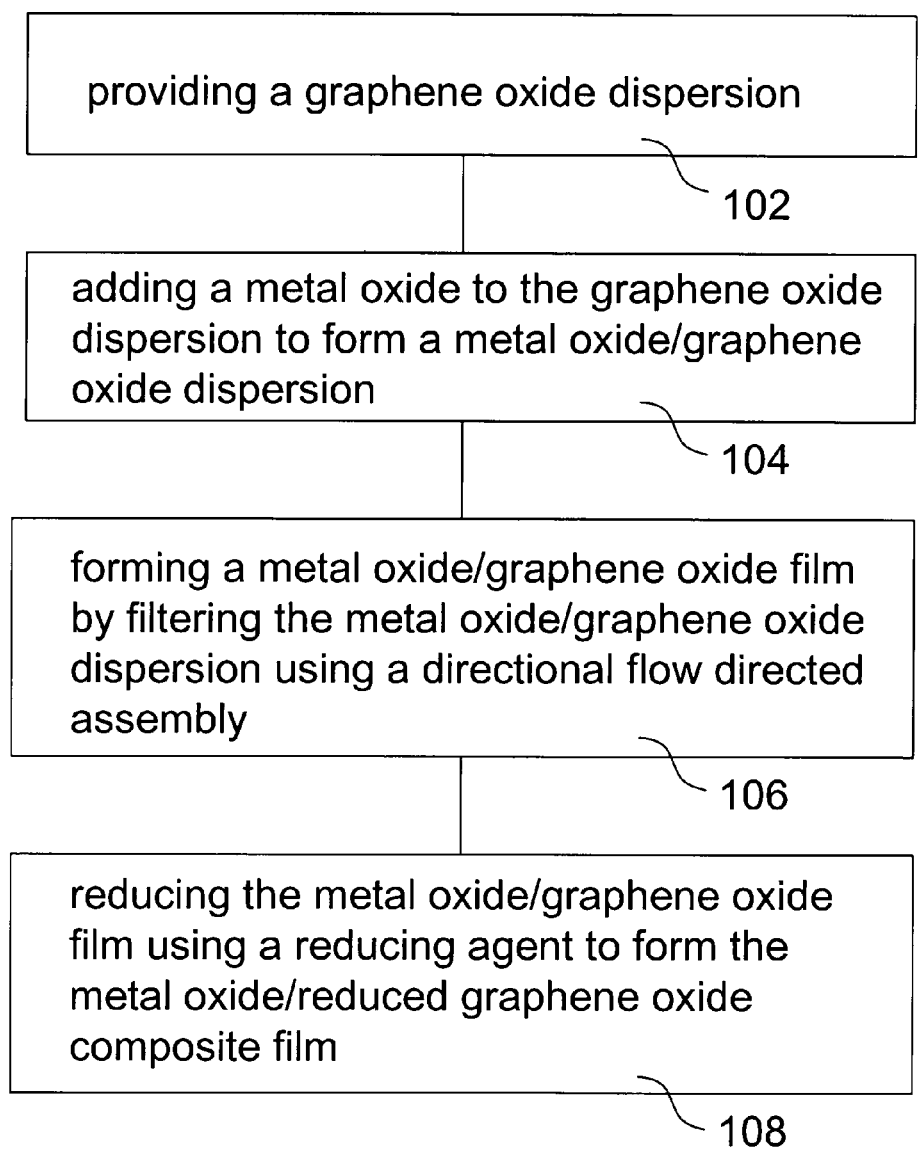
FIG. 1 shows a method of forming a metal oxide/reduced graphene oxide composite film according to one embodiment.

In a first aspect, the present invention refers to a method of forming a metal oxide/reduced graphene oxide composite film. FIG. 1 shows a method of forming a metal oxide/reduced graphene oxide composite film according to one embodiment. The method may include, in 102, providing a graphene oxide dispersion. The method may also include, in 104, adding a metal oxide to the graphene oxide dispersion to form a metal oxide/graphene oxide dispersion. The method may additionally include, in 106, forming a metal oxide/graphene oxide film by filtering the metal oxide/graphene oxide dispersion using a directional flow directed assembly. The method may further include, in 108, reducing the metal oxide/graphene oxide film using a reducing agent to form the metal oxide/reduced graphene oxide composite film.

In the present context, a dispersion is a material system including more than one phase where at least one of the phases consists of finely divided phase domains dispersed throughout a continuous phase. The finely divided phase domains may be in colloidal size range.

Metal oxide/reduced graphene oxide composite films formed by this method may have thicker cross sections and higher areal mass compared to conventional hybrid paper electrodes without affecting gravimetric or areal capacitance significantly. The gravimetric or areal capaciances may also be improved. Metal oxide/reduced graphene oxide composite films formed by this method are generally more mechanically robust and flexible compared to other thinner and low areal hybrid paper electrodes. Various steps may improve exfoliation of the metal oxide/reduced graphene oxide composite film, resulting in improved quality over conventional hybrid paper electrodes.

In one embodiment, the method may include modifying the dimensions of the metal oxide/graphene oxide film before reducing the metal oxide/graphene oxide film. For instance, the metal oxide/graphene oxide, film may be reduced from larger dimensions to smaller dimensions. The dimensions of the metal oxide/graphene oxide film may be modified to below about 6 cm in length and below about 4 cm in width, e.g. below about 3.5 cm in length and below about 1.5 cm in width, e.g. below 3 cm in length and below 1 cm in width. Advantageously, smaller dimensions may help in better penetration of the reducing agent to the film and consequently result in a more uniform exfoliation of the film during the reduction process. In one embodiment, the metal oxide/graphene oxide film may be cut or modified to maximize the perimeter to area ratio.

In one embodiment, the metal oxide/graphene oxide film may be adhered on an absorbent material suitable for absorbing excess reducing agent during reduction of the metal oxide/graphene oxide film. The metal oxide/graphene oxide film may be adhered on the absorbent material using an adhesive such as a thermal tape. The absorbent material may help the reducing agent to reach the back of the metal oxide/graphene oxide film, i.e. the side of the metal oxide/graphene oxide film adhered to the absorbent material. The absorbent material may be filter paper (i.e. cellulose filter paper). The filter paper used may be commercial filter paper. Other non-limiting examples of absorbent materials may include nylon, hydrogels, fabrics etc. The width of the absorbent material may be twice the width of the metal oxide/graphene oxide film. The length of the absorbent material may be less than or equal to 7 cm.

In one embodiment, reduction of the metal oxide/graphene oxide film may be carried out in a vessel such as a Teflon vessel. The metal oxide/graphene oxide film may be arranged on the wall of the vessel such that the length of the metal oxide/graphene oxide film film is substantially vertical. Positioning the metal oxide/graphene oxide film such that the metal oxide/graphene oxide film is substantially vertical may help reducing agent penetrate into the inner portions of the metal oxide/graphene oxide film film. Positioning the metal oxide/graphene oxide film such that the metal oxide/graphene oxide film is substantially vertical may also reduce the curvature of the film as well as the resultant stress if the surface on which the film is adhere to is curved. The metal oxide/graphene oxide film may be arranged such that all sides of the metal oxide/graphene oxide film are equally exposed to the reducing agent. The vessel may be an autoclave. The reducing agent may be selected from any one of hydrazine, hydrazine hydrate, urea or a combination thereof.

Figure 2A:
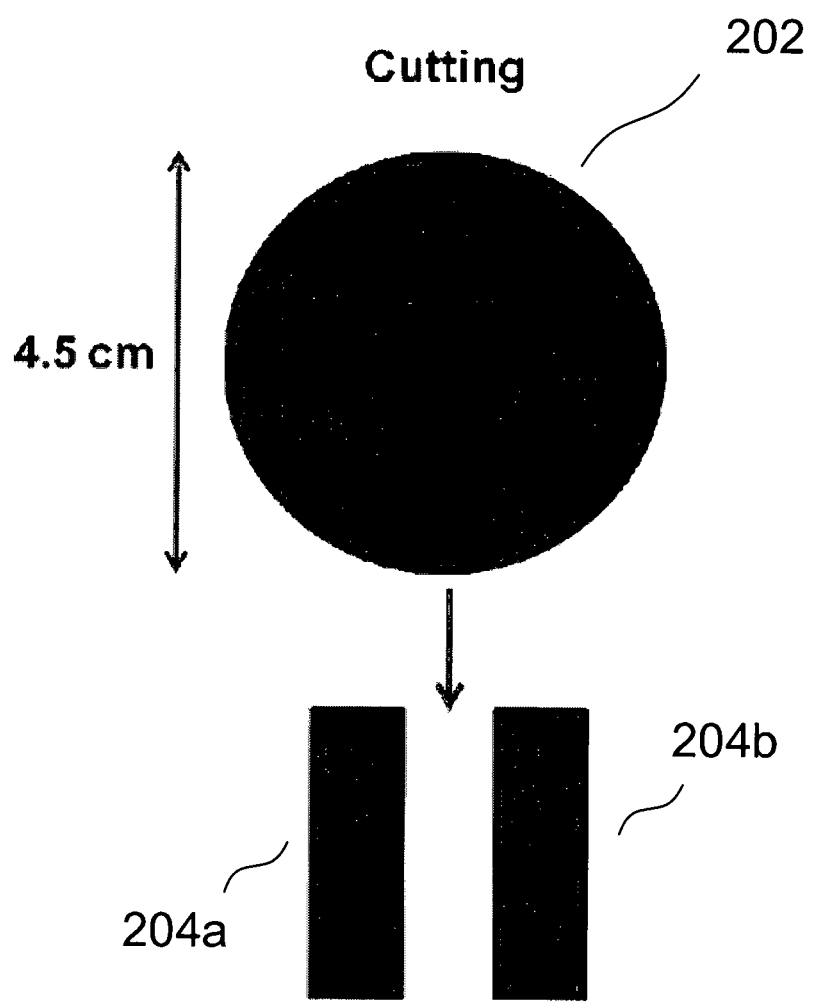
FIG. 2A shows a circular metal oxide/graphene oxide film with a diameter of 4.5 cm being reduced to two strips of metal oxide/graphene oxide film according to one embodiment.

FIG. 2A shows a circular metal oxide/graphene oxide film 202 with a diameter of 4.5 cm being reduced to two strips of metal oxide/graphene oxide film 204a, 204b according to one embodiment. Each strip is of dimensions 3 cm by 1 cm.

Figure 2B:
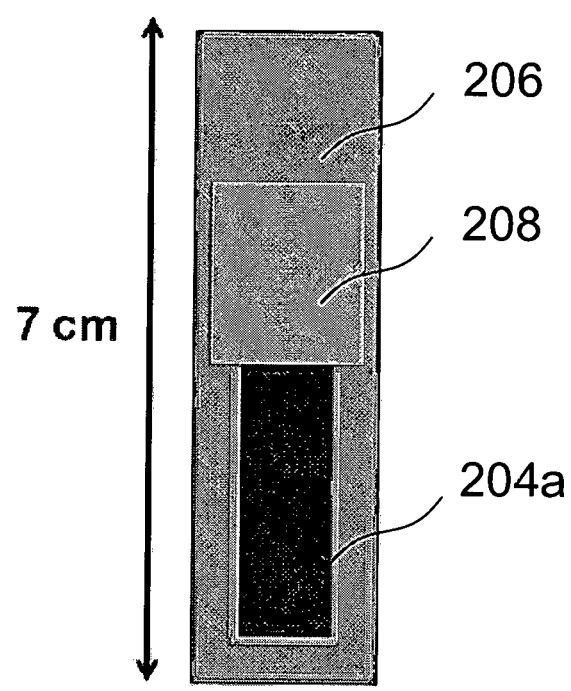
FIG. 2B shows the strip of metal oxide/graphene oxide film in FIG. 2A being adhered to a filter paper using a thermal tape according to one embodiment.

FIG. 2B shows the strip of metal oxide/graphene oxide film 204a in FIG. 2A being adhered to a filter paper 206a using a thermal tape 208a according to one embodiment. Additionally, the strip of metal oxide/graphene oxide film 204b is being adhered to filter paper 206b using thermal tape 208b. The length of the filter papers 206a, 206b is each 7 cm.

Figure 2C:
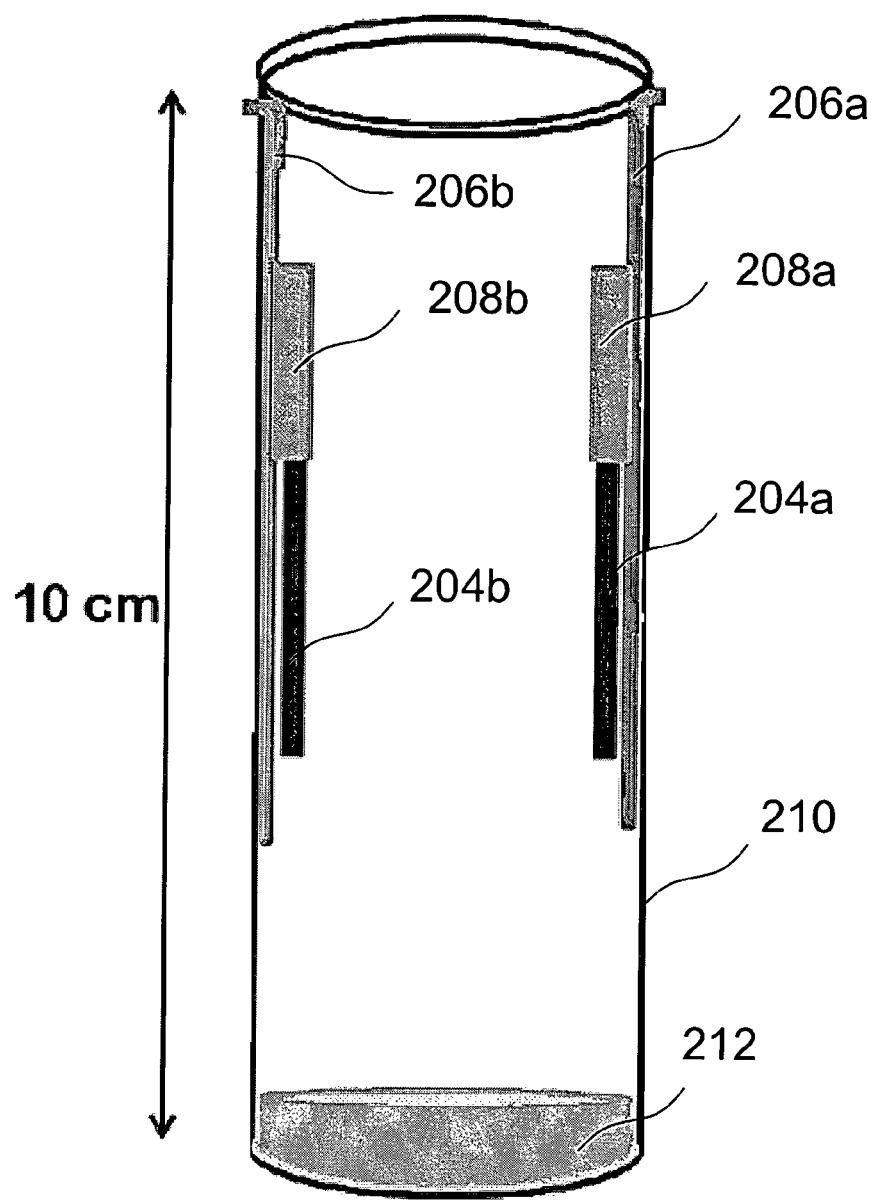
FIG. 2C shows the two strips of metal oxide/graphene oxide films in FIG. 2A being arranged on a Teflon vessel according to one embodiment.

FIG. 2C shows the two strips of metal oxide/graphene oxide films 204a, 204b in FIG. 2A being arranged on a Teflon vessel 210 according to one embodiment. The Teflon vessel 210 has a height of about 10 cm and an inner diameter of about 2.5 cm with a capacity of 50 ml. The Teflon vessel 210 acts as a sealed autoclave during the reduction process. The vessel 210 contains about 2 of hydrazine solution 212. The metal oxide/graphene oxide films 204a. 204b are positioned vertically on the wall of the vessel 210. The metal oxide/graphene oxide films 204a. 204b may be positioned on the walls of the vessel together with the filter papers 206a, 206b and the thermal tapes 208a, 208b. Hydrazine vapour from the hydrazine solution 212 acts as a reducing agent to reduce the metal oxide/graphene oxide film 204a, 204b during the reduction process.

Experiments have been carried out with metal oxide/graphene oxide films 204a, 204b of different dimensions. It has been found that films 204a, 204b with lengths below 3 cm and widths below 1 cm results in a more uniform exfoliation when the reduction is carried out in the vessel 210.

The filter paper 206a, 206b helps the reducing agent reach the back of the metal oxide/graphene oxide films 204a, 204b, i.e. the side of the metal oxide/graphene oxide films adhered to the filter papers 206a, 206b. The filter papers 206a, 206b are found to be wetted by reducing agents after reduction.

Positioning the metal oxide/graphene oxide film 204a, 204b such that the metal oxide/graphene oxide film 204a, 204b is substantially vertical may help reducing agents such as hydrazine vapour penetrate into the inner portions of the metal oxide/graphene oxide film film 204a, 204b. On the other hand, positioning the metal oxide/graphene oxide film 204a, 204b horizontally may prevent uniform flow of reducing agents such as hydrazine vapour into the inner portions of the metal oxide/graphene oxide film film 204a, 204b.

Also, positioning the metal oxide/graphene oxide film 204a, 204b horizontally may result in the metal oxide/graphene oxide film 204a, 204b being curved due to the curvature of the vessel 210, which would induce stress continuously during the reduction process. On the other hand, positioning the metal oxide/graphene oxide film 204a, 204b such that the metal oxide/graphene oxide film 204a, 204b is substantially vertical may reduce the curvature and the stress induced during the reduction process.

Further, positioning the metal oxide/graphene oxide film 204a, 204b on the cap of the vessel 210 may reduce the exposure of the metal oxide/graphene oxide film 204a, 204b to the hydrazine vapour and increases the likelihood of the metal oxide/graphene oxide film 204a, 204b to be contaminated by air outside the vessel 210 due to leaks between the cap and the body of the vessel 210. Moreover, if the distance between the metal oxide/graphene oxide film 204a, 204b and the hydrazine solution 212 is too far (e.g. about 10 cm or more), there may be insufficient reducing agent, i.e. hydrazine vapour reaching the metal oxide/graphene oxide film 204a, 204b for complete reduction of the metal oxide/graphene oxide film 204a, 204b at such a distance.

For the example shown in FIG. 2C, the metal oxide/graphene oxide film 204a, 204b should be positioned at a distance of about 3 cm to about 4 cm from the hydrazine solution 212. Positioning the metal oxide/graphene oxide film 204a, 204b at a distance less than 3 cm from the hydrazine solution 212 may cause the metal oxide/graphene oxide film 204a, 204b to get wet easily from the continuous exposure to hydrazine vapour, resulting in the stacking of the resultant reduced graphene oxide sheets. Positioning the metal oxide/graphene oxide film 204a, 204b at a distance more than 4 cm from the hydrazine solution 212 may cause incomplete reduction of the metal oxide/graphene oxide film 204a, 204b as highlighted earlier.

The reduction time may range from about 12 hours to about 48 hours, e.g. from about 18 hours to about 36 hours, e.g. from about 22 hours to about 26 hours, from about 23 hours to about 25 hours, e.g. about 24 hours. The temperature in which reduction occurs may range from about 50° C. to about 150° C., e.g. from about 60° C. to about 100° C., from about 80° C. to about 90° C., e.g. about 85° C.

Reducing the metal oxide/graphene oxide film using a vapour-based reducing agent such as hydrazine vapour may remove the need for a dispersant agent. Further, the reduction may be carried out at relatively low temperatures. Advantageously, formation of aggregated reduced graphene oxide (RGO) due to high temperature exposure or "contaminated" RGO due to the presence of dispersant agent may be avoided. Release of gaseous species such as carbon dioxide ($CO_2$) formed during the reduction process may help to exfoliate the graphene oxide paper and prevents it from forming a compact layered structure.

In one embodiment, the directional flow directed assembly may include a filter paper such as a cellulose filter paper. In one preferred embodiment, the filter paper may have a maximum pore size of about 0.25 µm. Experiments have shown that metal oxide/graphene oxide film obtained from filter papers with maximum pore sizes of about 0.25 µm tend to have significantly less cracks and is less brittle than using filter papers with larger pore sizes or using other materials. Alternatively, the directional flow directed assembly may also include nylon.

In one embodiment, forming the composite may further include treating the metal oxide/reduced graphene oxide composite film with acid after reducing the metal oxide/graphene oxide composite film. In one embodiment, forming the metal oxide/reduced graphene oxide composite film may further include drying the metal oxide/reduced graphene oxide composite film after treating the metal oxide/reduced graphene oxide composite film with acid. Drying the metal oxide/reduced graphene oxide composite film may include partially drying the metal oxide/reduced graphene oxide composite film.

Figure 3:
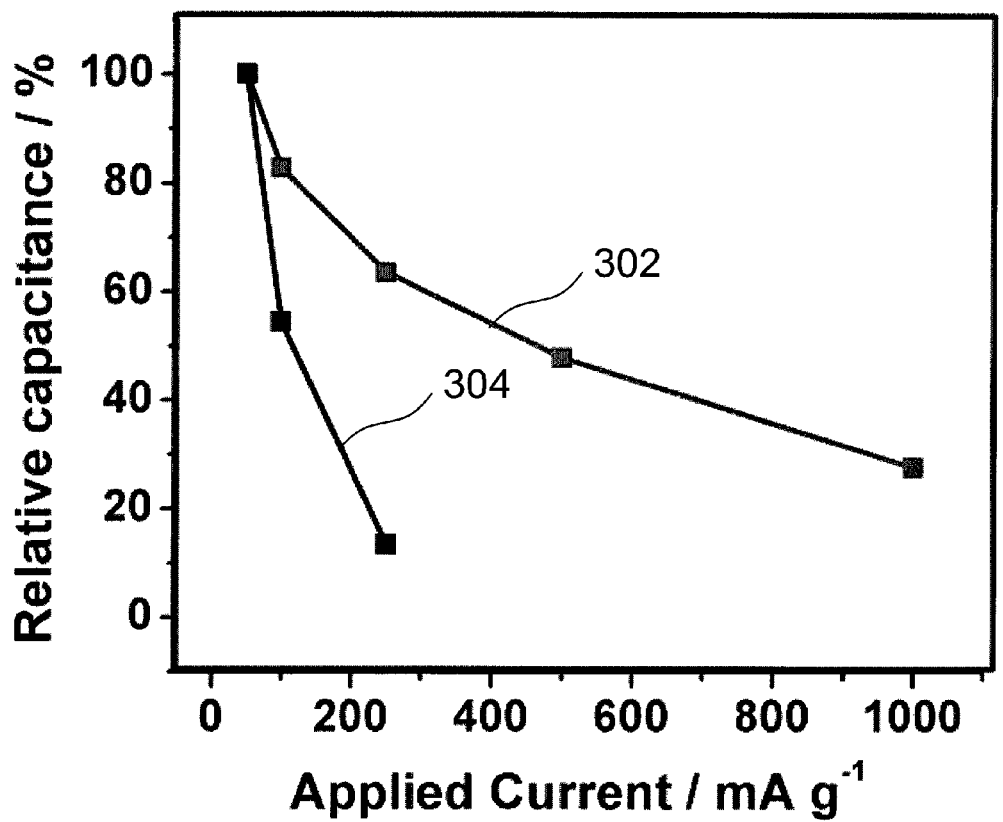
FIG. 3 is a graph of relative capacitance (in %) against applied current density of the metal oxide/reduced graphene oxide composite film (mAg$^{-1}$).

The acid used may be any suitable acids, including nitric acid, hydrochoric acid, sulphuric acid etc. The acid may be a concentrated acid (e.g. 6M $HNO_3$). The film may be treated with acid for a duration ranging from 2 hours to about 10 hours, e.g. from about 4 hours to about 6 hours, e.g. about 5 hours. Advantageously, treating the metal oxide/reduced graphene oxide composite film with acid helps enhance the hydrophilicity of the composite film and facilitates the ion penetration of the aqueous electrolyte. As a result, the capacitance of the electrode formed from the metal oxide/reduced graphene oxide composite film may possess better capacitance performance, especially at higher discharge rates. FIG. 3 is a graph of relative capacitance (in %) against applied current density of the metal oxide/reduced graphene oxide composite film ($mAg^{-1}$). Line 302 represents the metal oxide/reduced graphene oxide composite film sample which has been treated with acid. Line 304 represents the metal oxide/reduced graphene oxide composite film sample which has not been treated with acid. FIG. 3 shows that the non acid treated composite film sample cannot undergo the charge/discharge process at current density higher than 250 $mAg^{-1}$. Also, the rate capability of the non acid treated composite film sample is worse than the rate capability of the acid treated composite film sample. The poor wetting property of the non acid trated composite film sample results in difficulties of ions to reach the inner part of the electrode, especially at higher charge/discharge, leading to poor rate capability.

Drying the metal oxide/reduced graphene oxide composite film may be carried out using a hot plate. Drying may be carried out from about 5 hours to about 15 hours, e.g. from about 8 hours to about 12 hours, from about 9 hours to about 11 hours, e.g. about 10 hours. The metal oxide/reduced graphene oxide composite film may be dried at a temperature ranging from about 40° C. to about 80° C., e.g. from about 50° C. to about 70° C., e.g. about 60° C. Alternatively, drying the metal oxide/reduced graphene oxide composite film may be carried out using other suitable means such as a heater, an oven etc.

In one embodiment, the metal oxide may be added to the graphene oxide dispersion by adding a metal oxide precursor to the graphene oxide dispersion. The metal oxide precursor may reacted in the graphene oxide dispersion to form the metal oxide. The metal oxide precursor may be a metal salt. The metal oxide precursor used depends on the metal oxide desired. For instance, $NH_4VO_3$ may be used to form $V_2O_5$, $Mn(NO_3)_2$ may be used to form $MnO_2$, $Co(NO_3)_2 \cdot 6H_2O$ may be used to form $Co_3O_4$, and $Ni(NO_3)_2 \cdot 6H_2O$ may be used to form NiO etc. In an alternative embodiment, the metal oxide may be added directly to the graphene oxide dispersion.

In one embodiment, the method may further include further adding an oxidizing agent to the graphene oxide dispersion. The oxidizing agent may oxidize the metal oxide precursor to form the metal oxide. For instance, $HNO_3$ may be used to form $V_2O_5$, $KMnO_4$ may be used to produce $MnO_2$, citric acid may be used to produce $Co_3O_4$, and urea may be used to produce NiO. The oxidizing agent may be added to the graphene solution with stirring at an elevated temperature. Stirring may be carried out for at least 0.5 hours, e.g. at least about 1 hour, e.g. at least about 2 hours, e.g. at least about 3 hours. The elevated temperature may range from about 50° C. to about 95° C., e.g. about 80° C. to about 90° C., e.g. about 85° C. Stirring at an elevated temperature may help to ensure a more uniform distribution of metal oxide nanostructures (e.g. nanoparticles) on the reduced graphene sheets.

The method may further include applying sonication after adding the metal oxide precursor to the graphene oxide dispersion. Sonication may help to form the metal oxide. The duration in which sonication is applied may be for at least about 30 minutes, e.g. for at least about 60 minutes, for at least about 120 minutes.

In one embodiment, the metal oxide may be a transition metal oxide. The metal oxide may be selected from manganese oxide, vanadium oxide, cobalt oxide, nickel oxide, molybdenum oxide, ruthenium oxide, palladium oxide, chromium oxide, titanium oxide, copper oxide, iron oxide and zinc oxide.

In one embodiment, providing the graphene oxide dispersion may include exfoliating graphite oxide (GO). Exfoliating the graphite oxide may include centrifuging (and washing) the graphite oxide. Exfoliating the graphite oxide may include applying sonication to the graphite oxide. The graphite oxide may be diluted with deionized water and washed via centrifuging. Washing may be carried out using a dilute acid such as dilute hydrochloric acid (e.g. 1:10 HCl solution). In one instance, the graphite oxide dispersion may have a concentration of about 2 g $l^{-1}$ and the amount of graphite oxide dispersion may be 7.5 ml.

In one embodiment, the method may further include forming graphite oxide from graphite Graphite oxide may be formed from graphite using a modified Hummers method.

Forming graphite oxide from graphite may include oxidizing graphite using concentrated sulphuric acid and potassium permanganate.

In one embodiment, the graphite powder may be added to solution of concentrated $H_2SO_4$, $K_2S_2O_8$, and $P_2O_5$ (e.g. about 70° C. to about 90° C., e.g. about 80° C.). The resultant dispersion may be thermally isolated and allowed to cool to room temperature over a period of time (e.g. about 5 h to about 7 h e.g. about 6 h). The resultant dispersion may then be repeatedly diluted with distilled water, filtered, and washed until the pH of the dispersion became about neutral (e.g. pH about 6.5 to about 7.5). The filtered preoxidized graphite may be dried in air at ambient temperature-overnight. The preoxidized graphite may be then subjected to oxidation by Hummers' method. The oxidized graphite powder may be added to concentrated $H_2SO_4$ (e.g. at about −5° C. to about 5° C., e.g. 0° C.). $KMnO_4$ may be added gradually with stirring and cooling, so that the temperature of the mixture was not allowed to reach about 20° C. The mixture may be then stirred (e.g. at about 25° C. to about 45° C., e.g. about 35° C. for about 1 h to 3 h, e.g. about 2 h), and distilled water was added. The reaction may be allowed to continue for a predetermined period of time (about 10 minutes to about 30 minutes, e.g. about 15 minutes) before being terminated by adding a large amount of distilled water and $H_2O_2$ (e.g. 30%) solution. The mixture may then be filtered and washed with a suitable dilute acid (e.g. 1:10 HCl) in order to remove metal ions. The graphite oxide formed may be suspended in distilled water to give a graphite oxide dispersion. The graphite oxide dispersion may be further treated to remove metal ions and acids.

In one embodiment, a composite film may be provided. The composite film may be formed by a method described herein.

In a second aspect, the present invention relates to a composite film. The composite film may include one or more sheets of reduced graphene oxide (RGO). The composite film may further include one or more metal oxide nanostructures attached to the one or more sheets of reduced graphene oxide.

A film may also be referred to as paper. As such, a RGO film may be referred to as a RGO paper. Similarly, a metal oxide/RGO composite film may be referred to as a metal oxide/RGO paper.

Nanostructures refer to structures that have in their greatest dimension a mean diameter of 100 nm or smaller, preferably in the range of about 1 to about 50 nm. In one embodiments, nanostructures include nanoparticles.

In one embodiment, the nanostructures may be nanoparticles. Nanoparticles are particulate materials that have in their greatest dimension a mean diameter of 100 nm or smaller, preferably in the range of about 1 to about 50 nm. Additionally or alternatively, the nanostructures may include nanorods, nanobelts, nanopillars etc.

A sheet of graphene oxide may include one or a few layers, each layer including carbon atoms and oxygen containing groups.

Reduced graphene oxide (RGO) refers to graphene oxide with oxygen-containing groups partly removed. In other words, each layer of reduced graphene oxide have less oxygen atoms bonded to the carbon atoms than each layer of graphene oxide.

The oxygen-containing groups in RGO may provide anchoring sites for the metal oxide nanostructures. The incorporation of metal oxides in RGO may exploit the good electro-chemical double-layer capacitance (EDLC) of RGO and food pseudocapacitance behaviour of the metal oxide.

The ELDC may be due to accumulation of charges at the on the electrode/electrolyte double-layers, which is highly dependent on the effective surface area of the active material. Chemical or structural changes may be negligible during the transfer and accumulation of charges, making EDLC stable when subjected to high cycle loading. Pseudocapacitance, on the other hand, may be attributed to the fast and reversible Faradic redox reactions occuring on the near-surfaces of the active material, giving rise to charge generation. Unlike EDLC where the electrical charge storage is statically in the double-layers and enhanced by ionic migration between the electrodes without any interaction between the electrode and the ions, a pseudocapacitor does have a chemical reaction at the electrode. A typical reaction may be a redox reaction where the ion is $O^{2+}$ and during charging at one electrode there is a reduction reaction and the other electrode an oxidation reaction. In discharging the reaction is reversed having and the ions move in the other direction across the electrolyte. Besides redox reactions, intercalation and electrosoption may also contribute pseudocapacitance.

The low conductivity of metal oxide may make the metal oxide unsuitable for high mass loading and extended cycling. However, by forming the composite film, the RGO alleviates the low conductivity issues of the metal oxides, helps to provide a more stable cycling performance and promotes better reversibility at high loading mass.

In other words, the composite film combines the high conductivity and EDLC of RGO and the high pseudocapacitance of the metal oxide.

The metal oxide nanostructures anchored on the RGO may act as spacers for preventing aggregation of the RGO sheets but also provide pathways for effective ionic transport. Additionally, the surface area may be increased for EDLC, leading to high areal capacitance. Further, the composite film allow the use of organic electrolytes for achieving a larger working potential window.

In one embodiment, an electrode may be provided. The electrode may include the composite film.

The electrode may be a free-standing electrode. In other words, the electrode may be free of components such as current collector, binder or other additives. For instance, the electrode does not require a metal substrate as a current collector. Advantageously, manufacturing costs may be reduced. Additionally, weight of the electrode may also be reduced.

In one embodiment, the electrode may have high areal mass. For instance, the electrode may have an areal mass of more than about 1.5 mg cm$^{-2}$, e.g. more than about 2.0 mg cm$^{-2}$. A high areal mass may lead to a high areal capacitance for a given specific capacitance. As highlighted above, a high areal capacitance may allow the electrode to store more charges per unit area and is crucial for the miniaturization of energy storage devices.

In one embodiment, the electrode is flexible and have high mechanical strength. The electrode may have a tensile strength of more than 5 MPa, e.g. more than 6 MPa. The electrode may have a Young's Modulus of more than 1 GPa, e.g. more than 1.5 GPa, e.g. more than 1.7 GPa. The electrode may exhibit little deviation in capacitance behaviour when the electrode is bent compared to when the electrode is unbent or flat. The deviation may be less than 30% or less than 20% or less than 10% or less than 5% or less than 2%.

The electrode may have an areal capacitance of more than 150 mF cm$^{-2}$. The electrode may have an areal capacitance of more than 150 mF cm$^{-2}$ when a current having a current density of less than or equal to about 100 mA g$^{-1}$, e.g. less than or equal to about 50 mA g$^{-1}$ is applied. The electrode may have an areal capacitance of more than 300 mF cm$^{-2}$. The electrode may have an areal capacitance of more than 300 mF cm$^{-2}$ when a current having a current density of less than or equal to about 50 mA g$^{-1}$ is applied.

In one embodiment, a device including an electrode having the composite film may be provided. The device may have a further electrode. The further electrode may include a reduced graphene oxide (RGO) film. The device may be a capacitor device such as an asymmetric super capacitor device. The electrode having the composite film may be the anode and the further electrode including the RGO film may be the cathode.

The device may exhibit negligible degration in performance when in the flat (unbent) state and in the bent state. The bent device may have a specific capacitance of more than 80% or more than 90% or more than 95% to a specific capacitance of the flat (unbent) device.

The device may be robust. The device may be configured to retain more than 80% of its capacitance value after 8,000 cycles of continuos charging and discharging. The device may be able to retain more than 90% of its capacitance value after 3,600 cycles of continuous charging and discharging.

The device may be able to achieve a maximum energy density of more than about 30 μW h cm$^{-2}$ e.g. more than 35 μW h cm$^{-2}$. The device may be able to achieve a maximum energy density of more than about 30 μW h cm$^{-2}$ e.g. more than 35 μW h cm$^{-2}$ both in the flat (unbent) state and the bent state. The device may be able to power 8 light emitting diode (LED) bulbs.

Experimental Section

Manganese Dioxide/Reduced Graphene Oxide (MnO$_2$/RGO)

Pre-oxidized graphite oxide was prepared via a modified Hummers method. Graphite oxide was exfoliated via sonication, centrifuged and washed to obtain graphene oxide (GO) dispersion (2 g l$^{-1}$). Metal oxide salt (Mn(NO$_3$)$_2$) was added into 7.5 ml GO dispersion and underwent further sonication at fixed time (30 minutes). KMnO$_4$ as an oxidizing agent was added into the GO dispersion while stirring at a fixed temperature of 85° C. for 1 hour. The product was then filtered using directional flow directed assembly via a vacuum filtration method. The filter paper used during vacuum filtration is cellulose with maximum pore size of 0.025 μm. The filtered metal oxide/GO paper was dried and peeled off manually from the filter paper. No solvent or dissolution of the filter paper was required in this step. The hybrid paper was defined into appropriate dimensions (3 cm by 1 cm) to expose as much of the sides of the sample as possible to open air. The hybrid paper was then adhered onto a vertical filter paper strip holder (commercial filter paper) using thermal tape. The vertical filter paper strip holder is twice the width of the hybrid paper and its length is 7 cm. The vertical filter paper strip holder and the hybrid paper were positioned inside a 50 ml Teflon vessel that has been preloaded with 2 ml hydrazine solution. The hybrid paper was placed at a distance of 3 to 4 cm from the hydrazine solution. The reduction of metal oxide/GO paper using N$_2$H$_4$ vapor via autoclave treatment at fixed temperature of 85° C. was carried out for 24 hours. The paper was then treated in concentrated acid solution (6 M HNO$_3$) for 5 hours. The paper is then air dried on a hotplate at 60° C. for 10 hours.

Modified vapor reduction method was introduced during the reduction process, by exposing the paper electrodes that are positioned on the wall of the Teflon vessel to the hydrazine vapor. In order to have a more controlled and uniform hydrazine thermal exposure, the MnO$_2$/graphene oxide (GO) was cut into 3 cm by 1 cm. Also, filter paper is used as a holder to absorb excess hydrazine vapour and to facilitate the hydrazine vapour to reach the back of the MnO$_2$/GO film. Further, the MnO$_2$/GO film is positioned vertically on the vessel. The MnO$_2$/GO film is placed at a distance of 3 to 4 cm from the hydrazine solution.

Figure 4A:
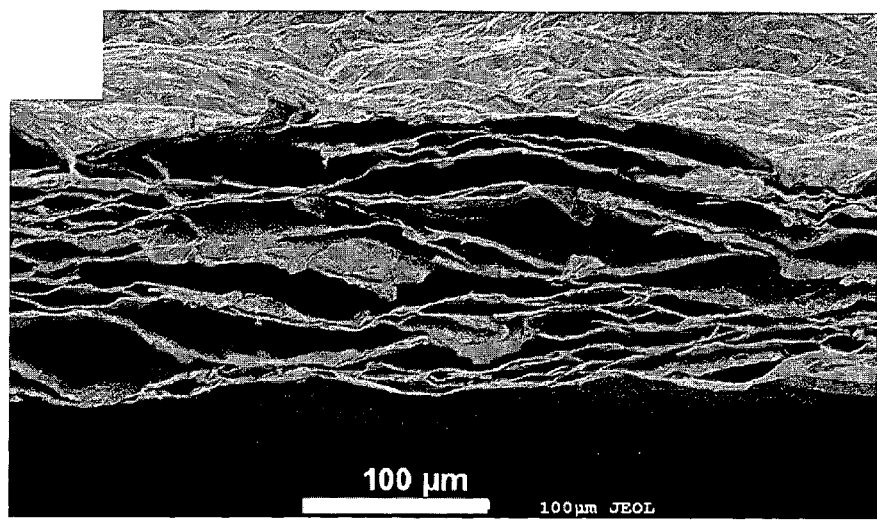
FIG. 4A shows a cross sectional view of MnO$_2$/RGO sheets at low magnification.
Figure 4B:
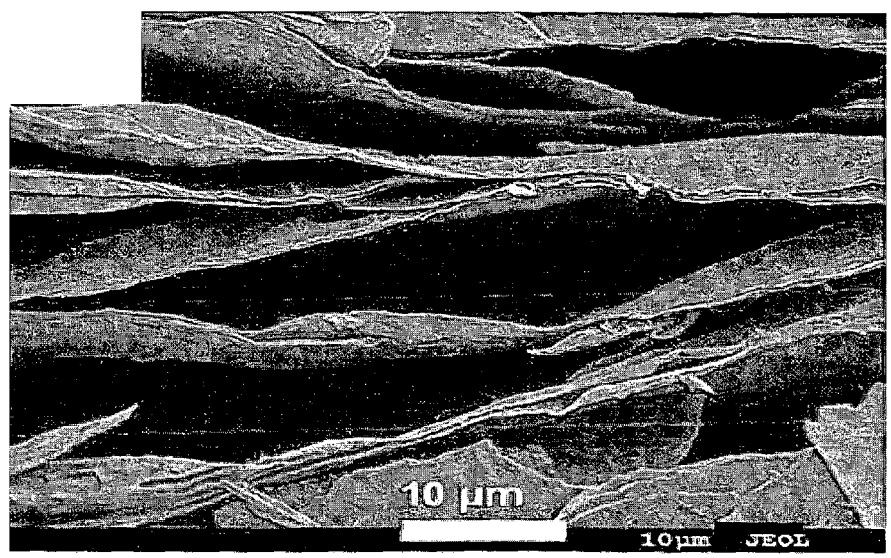
FIG. 4B shows a cross sectional view of MnO$_2$/RGO sheets at high magnification.

Cross sectional views of the scanning electron micrograph MnO$_2$/RGO sheets are shown in FIGS. 4A and 4B. FIG. 4A shows a cross sectional view of MnO$_2$/RGO sheets at low magnification. FIG. 4B shows a cross sectional view of MnO$_2$/RGO sheets at high magnification. Stacking and aggregation problem of the RGO sheets are commonly observed in literature reported to date. As a result, the unique properties of individual graphene sheets, such as high surface area, were compromised or not available in macroscopic graphene paper assembly. The method described herein is able to obtain well separated RGO sheets as clearly observed in FIGS. 4A and 4B.

Figure 4C:
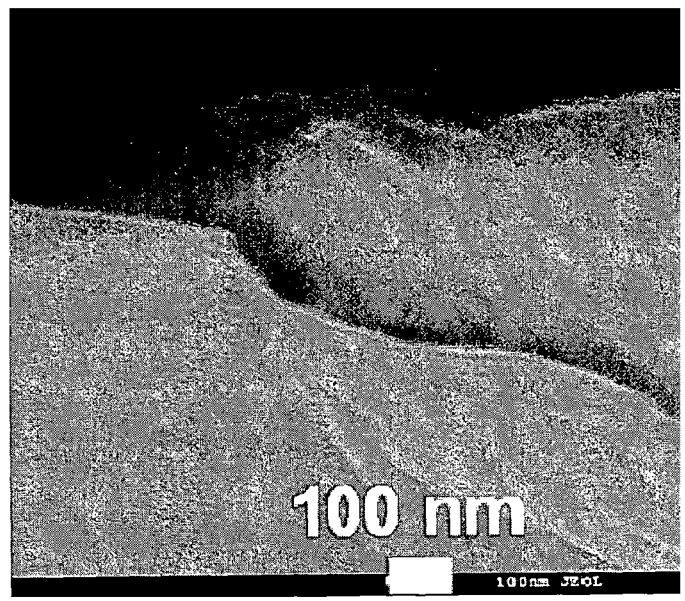
FIG. 4C shows a top view of an edge of a MnO$_2$/RGO sheet.
Figure 4D:
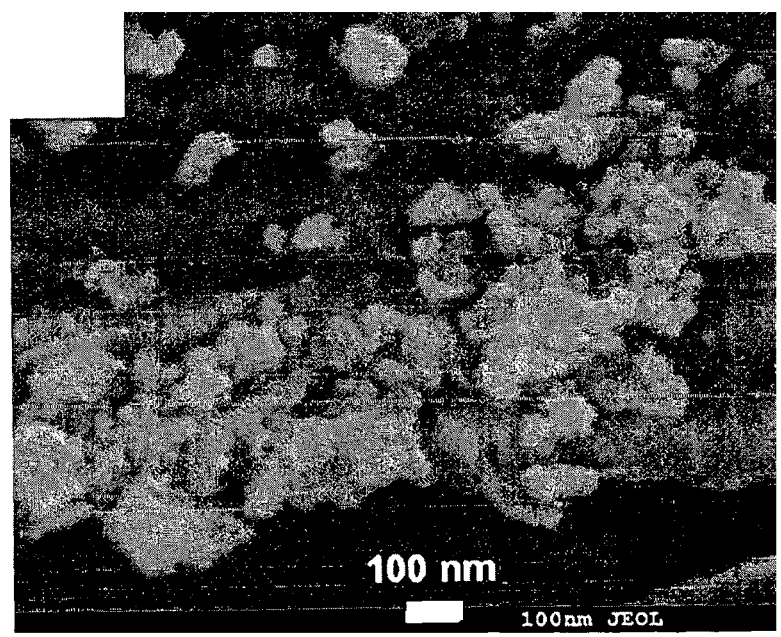
FIG. 4D shows MnO$_2$/RGO sheets showing the presence of MnO$_2$ nanoparticles.

FIG. 4C shows a top view of an edge of a MnO$_2$/RGO sheet. FIG. 4C shows that RGO sheets have an open sheet arrangement. These characteristics are particularly useful to provide more accessible surface area and easy pathways for fast electrolyte ions diffusion, leading to low charge transfer resistance and high capacitance of the electrode. FIG. 4D is a top view of MnO$_2$/RGO sheets showing the presence of MnO$_2$ nanoparticles. Nanospherical morphology of MnO$_2$ can be seen sandwiched within RGO sheets indicating successful attachment of MnO$_2$ on the RGO sheets.

Figure 4E:
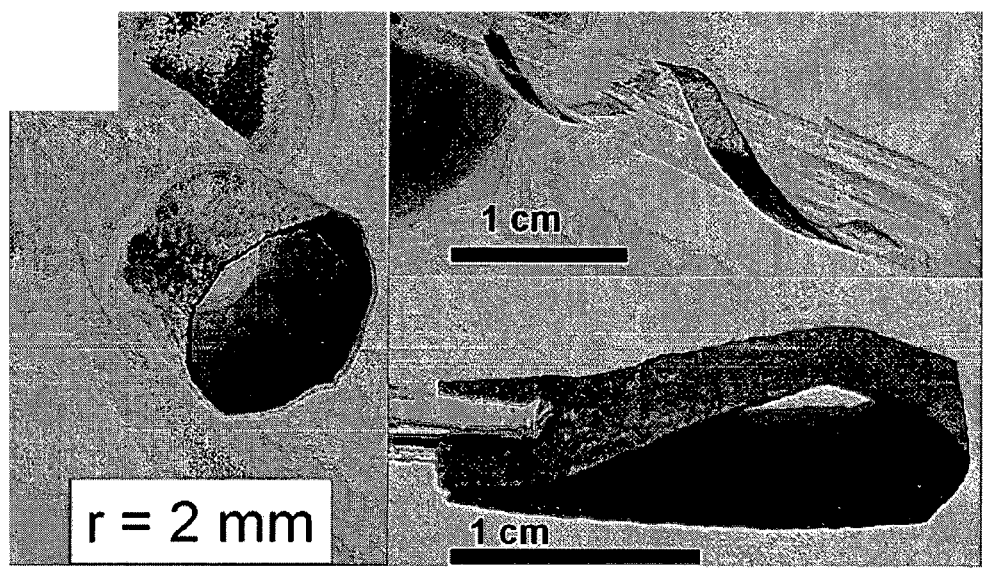
FIG. 4E shows a digital image of MnO$_2$/RGO sheets.

FIG. 4E shows digital images of free-standing MnO$_2$/RGO paper electrode. The image on the left in FIG. 4E shows the MnO$_2$/RGO paper being folded and slotted in a test tube. The top right image in FIG. 4E shows the MnO$_2$/RGO paper being placed in a test tube. The bottom right image in FIG. 4E shows the MnO$_2$/RGO paper being held by a pair of tweezers. Macroscopic layered feature of interconnecting RGO sheets acts as mechanical support for MnO$_2$/RGO paper, resulting in the good mechanical properties of this hybrid paper. FIG. 4E shows remarkable flexibility of large areal mass MnO$_2$/RGO paper electrode (≈3.7 mg cm$^{-2}$) upon bending and folding.

Figure 5A:
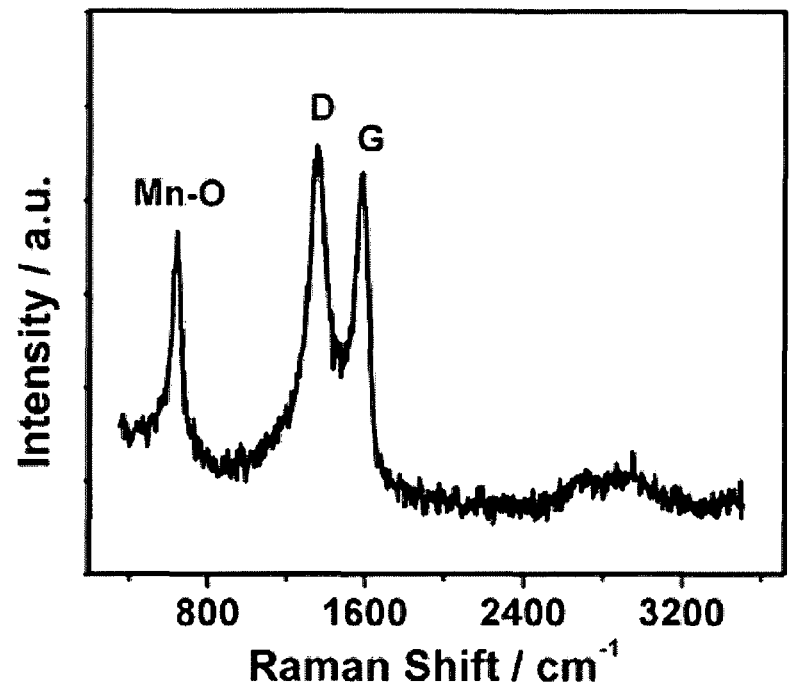
FIG. 5A shows the Raman spectra of MnO$_2$/RGO paper measured from Raman confocal microscopy.

FIG. 5A shows the Raman spectra of MnO$_2$/RGO paper measured from Raman confocal microscopy. There are three peaks observed in the Raman spectra of MnO$_2$/RGO paper within the range of 400 to 2000 cm$^{-1}$. The peak at 641 cm$^{-1}$ is due to the Mn—O stretching vibration in basal plane of MnO$_6$ and symmetric stretching vibration of the MnO$_6$ group which indicate the presence of MnO$_2$ in our sample. The presence of RGO is confirmed with the existence of G and D band. The G band which is the characteristic of sp$^2$ hybridized C—C bonds in two dimensional hexagonal lattice can be found at 1580 cm$^{-1}$. This peak position is consistent with Raman spectra of graphene prepared from micromechanical cleavage method, and there is no shift to a higher wavenumber which is typically found for N doped graphene. This indicates that MnO$_2$/RGO paper is not doped by nitrogen. The D band that corresponds to the defect and disorder carbon in graphite layers is detected at 1350 cm$^{-1}$. The high intensity of D peak is commonly observed in chemically reduced GO due to the presence of residual oxygen functional groups and other defects.

Figure 5B:
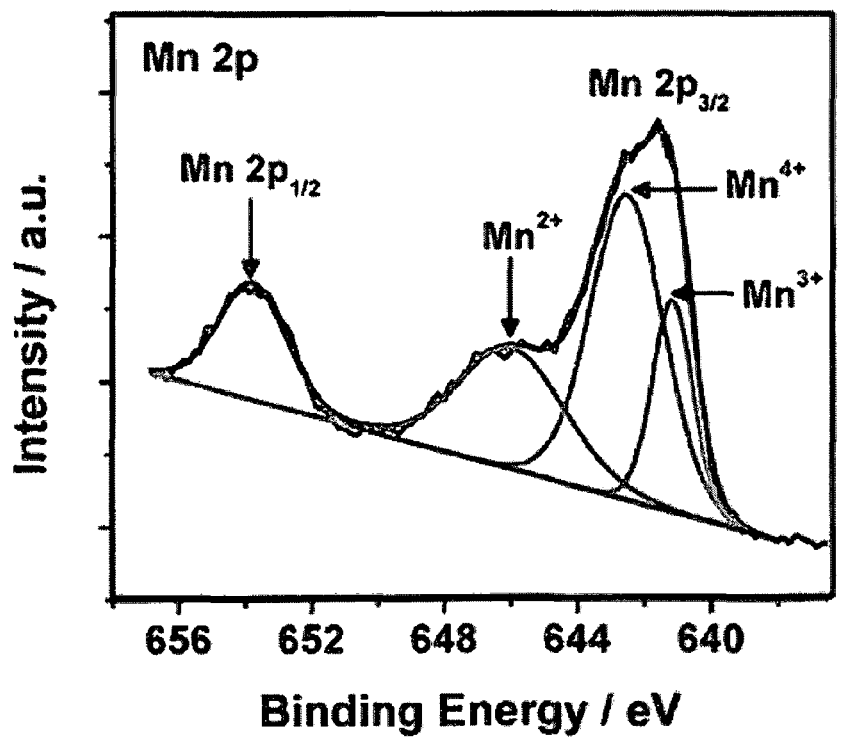
FIG. 5B shows the X-ray photoelectron spectroscopy spectra (XPS) of Mn 2p signal of MnO$_2$/RGO paper.

FIG. 5B shows the X-ray photoelectron spectroscopy spectra (XPS) of Mn 2p signal of MnO$_2$/RGO paper. It includes two peaks which correspond to the spin orbit doublet of Mn 2p$_{3/2}$ and Mn 2p$_{1/2}$, respectively. The Mn $2p_{1/2}$ peak is centered at 653.8 eV, while Mn $2p_{3/2}$ peak can be deconvoluted into three peaks which indicate the presence of mixed valence of manganese oxide phases. Deconvoluted peaks of Mn $2p_{3/2}$ at 641.2 and 642.5 eV may be attributed to the presence of Mn(III) and Mn(IV) species in the sample, respectively. The shakeup satellite which is centered at 646 eV has been reported to be due to the presence of Mn(II) oxide phase. The amount of each oxide phase estimated from XPS data is about 29.3, 19.4 and 51.3% for Mn(II), Mn(III) and Mn(IV) phase, respectively. Thus, $MnO_2$ exists as the major manganese oxide phase in $MnO_2$/RGO paper.

Figure 5C:
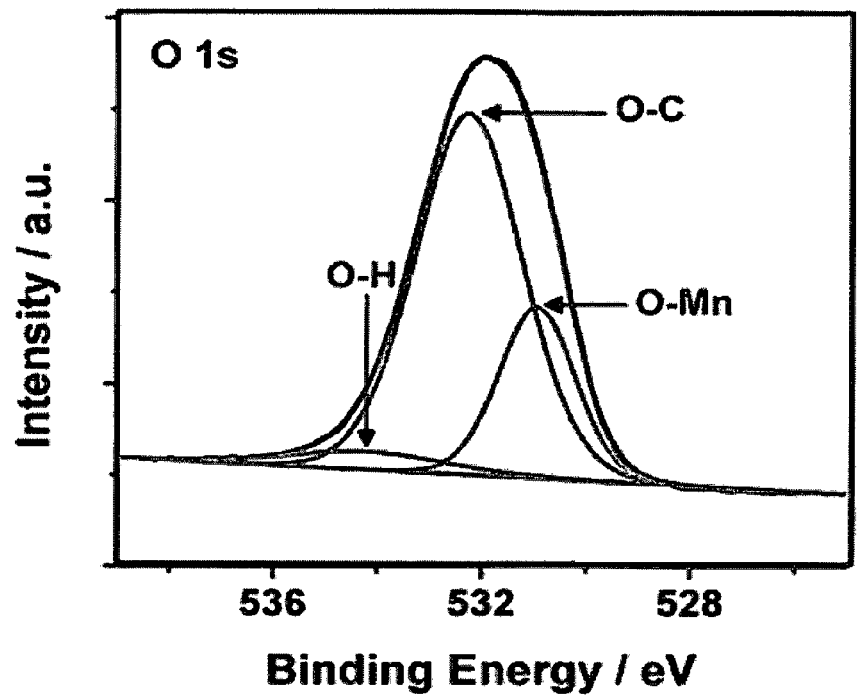
FIG. 5C shows the X-ray photoelectron spectroscopy spectra (XPS) of O 1s signal of MnO$_2$/RGO paper.

FIG. 5C shows the X-ray photoelectron spectroscopy spectra (XPS) of O 1s signal of $MnO_2$/RGO paper. The presence of $MnO_2$ in the sample was further confirmed with O 1s signal of XPS spectra which can be deconvoluted into three peaks. The peaks centered at 530.9 and 532.3 eV correspond to O—Mn and O—C bond respectively. In addition, the weak signal at 534.2 eV indicates the presence of O—H bond. The presence of hydrates in $MnO_2$ electrode has been reported to enhance the diffusion of electrolyte ions via hopping within $H_2O$ and $OH^-$ sites.

Figure 5D:
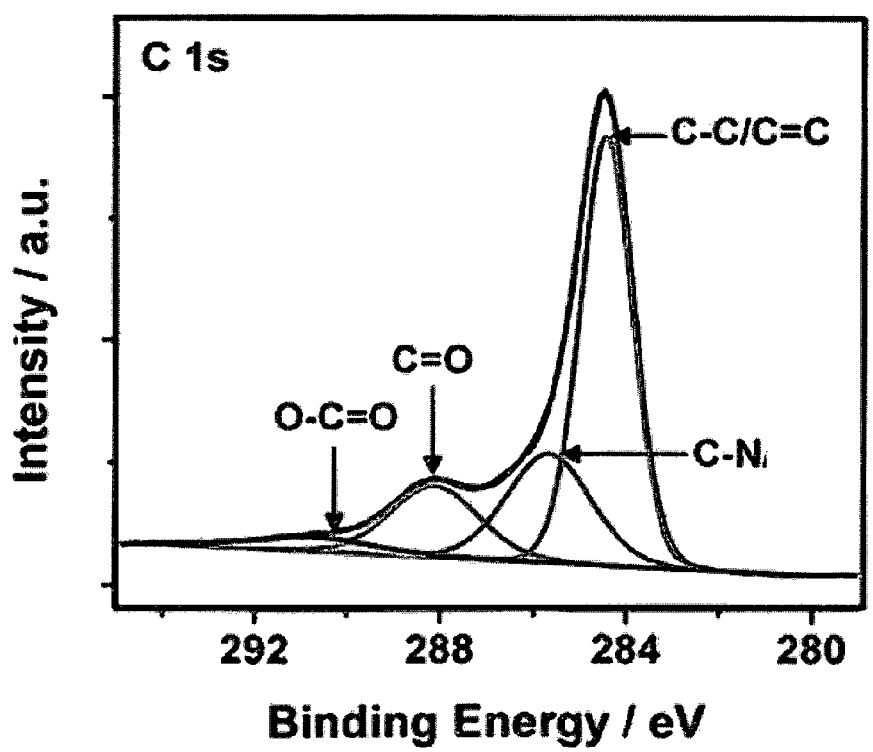
FIG. 5D shows the X-ray photoelectron spectroscopy spectra (XPS) of C 1s signal of MnO$_2$/RGO paper.

FIG. 5D shows the X-ray photoelectron spectroscopy spectra (XPS) of C 1s signal of $MnO_2$/RGO paper. The C 1s peak in FIG. 5D can be deconvoluted into four peaks, indicating the presence of four types of carbon bonds: C—C/C═C (284.4 eV), C═O (288.1 eV), O═C—O (290.6 eV). The C 1s peak includes mostly C—C/C═C bonds and the peak intensities of the oxygen associated groups are rather low. These characteristics suggest that significant amount of deoxygenation process of graphene oxide had taken place during the reduction, indicating the successful reduction of graphene oxide into reduced graphene oxide. Besides that, C bound to nitrogen is also observed at 285.6 eV, which can be attributed to the reduction process by hydrazine as well as $HNO_3$ treatment during the final step of the synthesis process. The presence of the C—N bond has been observed in several works on RGO that used hydrazine as reducing agent.

Figure 5E:
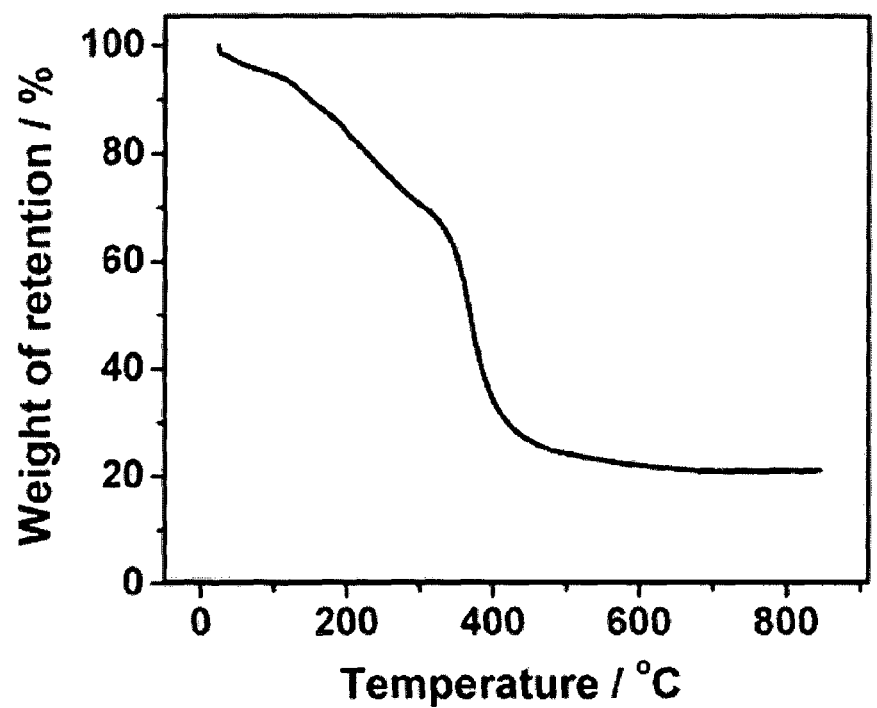
FIG. 5E is a plot of weight retention (%) against temperature (° C.) illustrating the thermogravimetric analysis of MnO$_2$/RGO paper.
Figure 5F:
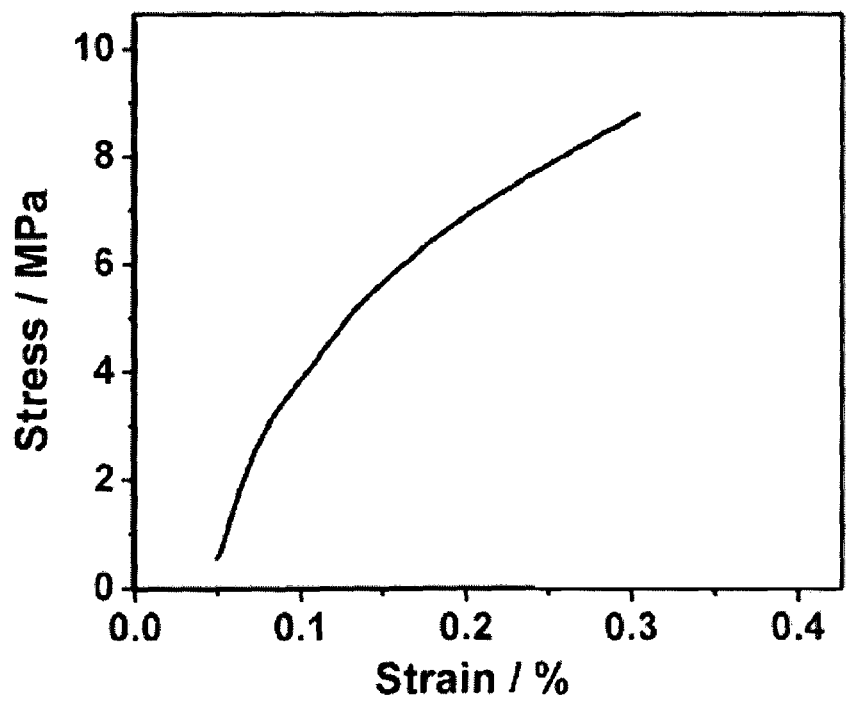
FIG. 5F is a plot of stress (MPa) against strain (%) illustrating dynamic mechanical analysis (DMA) of $MnO_2$/RGO paper.

FIG. 5E is a plot of weight retention (%) against temperature (° C.) illustrating the thermogravimetric analysis of $MnO_2$/RGO paper. FIG. 5E shows that the amount of $MnO_2$ in the $MnO_2$/RGO paper estimated from thermogravimetric analysis (TGA). The $MnO_2$ content is estimated about 20%. Mechanical properties of the $MnO_2$/RGO electrode are investigated by dynamic mechanical analysis (DMA). FIG. 5F is a plot of stress (MPa) against strain (%) illustrating dynamic mechanical analysis (DMA) of $MnO_2$/RGO paper. Mechanical properties of $MnO_2$/RGO paper were investigated by using dynamic mechanical analysis (DMA). The measured tensile strength and Young's modulus extracted from stress strain curve of the sample is about 8.79 MPa and 2.89 GPa respectively, which is comparable to other free-standing graphene-based papers reported in the literature. Nevertheless, the estimated 2D Young's modulus ($E^{2D}$) of single layer $MnO_2$/RGO is lower than $E^{2D}$ of epitaxial and free-standing monolayer graphene. This is due to the presence of defects in the chemically reduced graphene oxide and local heterogeneities with the incorporation of $MnO_2$ in the free-standing graphene-based paper.

Figure 6:
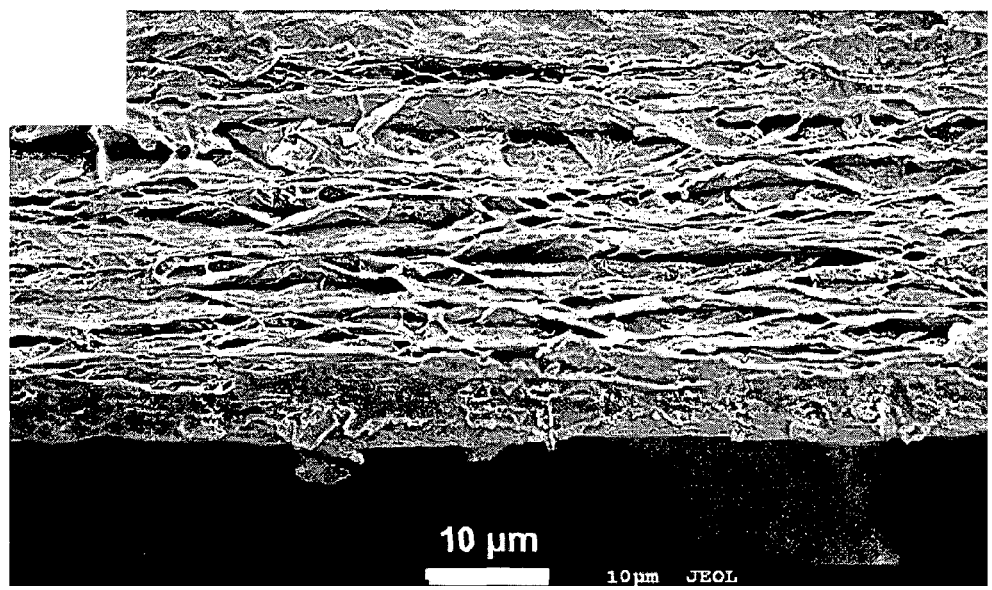
FIG. 6 shows a cross sectional view of $MnO_2$/RGO sheets formed by immersing $MnO_2$/GO in hydrazine solution.

In addition, $MnO_2$/RGO sheets are also formed by immersing $MnO_2$/GO in hydrazine solution in a petri disc. FIG. 6 shows a cross sectional view of $MnO_2$/RGO sheets formed by immersing $MnO_2$/GO in hydrazine solution. The cross sectional view of $MnO_2$/RGO paper sample that underwent autoclave reduction shows less aggregation and stacking of the RGO sheets compared to the sample reduced by immersion in hydrazine solution.

As shown in FIG. 4A and FIG. 6, the thickness of $MnO_2$/RGO paper of the similar mass reduced in the autoclave (FIG. 4A) is about four times of the $MnO_2$/RGO paper reduced by immersion inside the hydrazine solution (FIG. 6). This structure formed by hydrazine vapour reduction is particularly useful and provides easy pathway for the electrolyte ions diffusion during the charge discharge process, thus lead to the capacitive improvement of the supercapacitor electrode.

In order to explore the advantages of high mass, flexible and free-standing $MnO_2$/RGO papers as supercapacitor electrode, electrochemical studies of $MnO_2$/RGO paper are compared to RGO paper that has similar areal mass as $MnO_2$/RGO paper. Three electrode test configuration was employed to evaluate the electrochemical performance of both samples. A platinum sheet and Ag/AgCl were used as counter and reference electrodes respectively. The free-standing papers were directly connected to the metal clip as the working electrode for electrical connection without any metallic supports or other type of current collectors (e.g. metallic substrate, carbon paper, carbon cloth/foam).

Figure 7A:
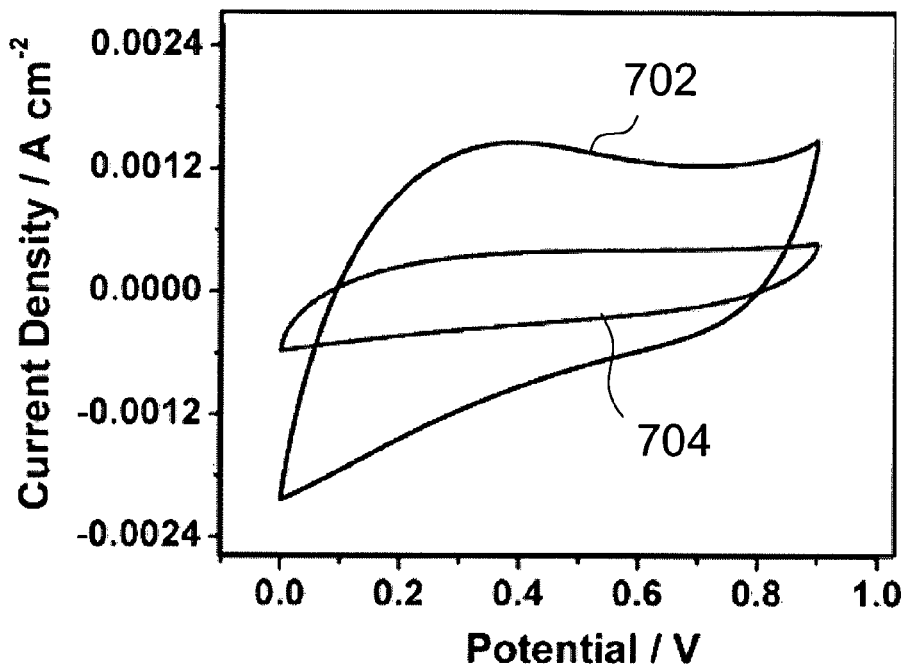
FIG. 7A shows the cyclic voltammograms (current density (A $cm^{-2}$) against potential (V)) of $MnO_2$/RGO free-standing paper and RGO free-standing paper (with mass of 3.6±0.1 mg $cm^{-2}$) from 0 to 0.9 V with Ag/AgCl as the reference electrode in 1 M $Na_2SO_4$.

FIG. 7A shows the cyclic voltammograms (current density (A $cm^{-2}$) against potential (V)) of $MnO_2$/RGO free-standing paper and RGO free-standing paper (with mass of 3.6±0.1 mg $cm^{-2}$) from 0 to 0.9 V with Ag/AgCl as the reference electrode in 1 M $Na_2SO_4$. 702 indicates the cyclic voltammogram of $MnO_2$/RGO free-standing paper while 704 indicates the cyclic voltammogram of RGO free-standing paper. Larger area under the cyclic voltammogram of $MnO_2$/RGO paper as compared to RGO paper indicates the capacitive improvement of RGO paper due the presence of $MnO_2$ pseudocapacitive materials. The voltammograms of both free-standing papers show rectangular shape indicating the ideal capacitive behavior due to the electrical double layer charge storage of reduced graphene oxide. 702 additionally indicates fast, reversible, successive surface redox reactions of $MnO_2$ in $MnO_2$/RGO hybrid paper.

Figure 7B:
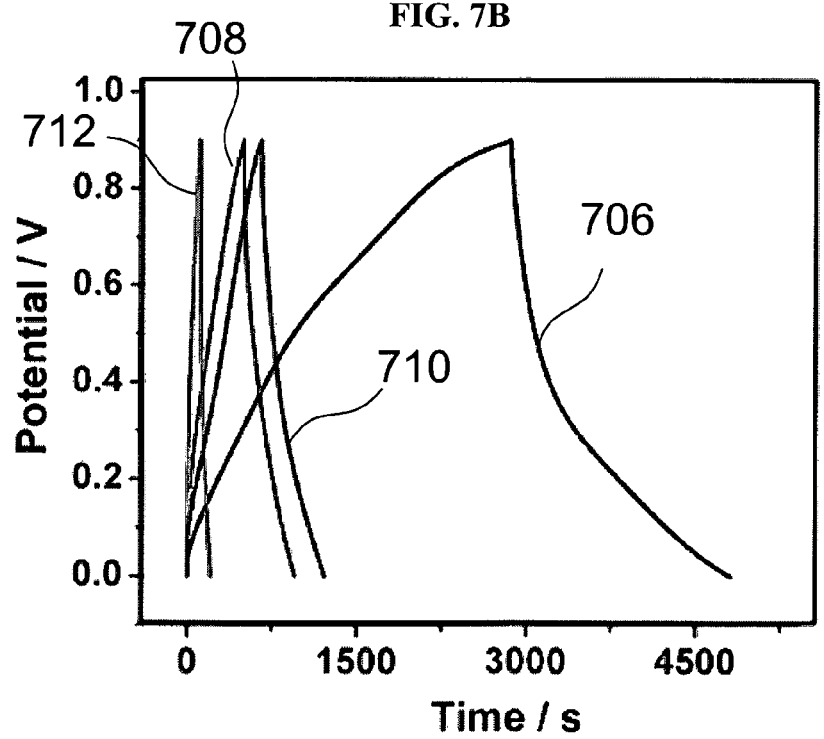
FIG. 7B shows the charge discharge curves (potential (V) against time (s)) of both RGO and $MnO_2$/RGO papers at different applied currents.

FIG. 7B shows the charge discharge curves (potential (V) against time (s)) of both RGO and $MnO_2$/RGO papers at different applied currents. 706 indicates the charge-discharge curve of $MnO_2$/RGO paper at 100 mA $g^{-1}$, 708 indicates the charge-discharge curve of $MnO_2$/RGO paper at 250 mA $g^{-1}$, 710 indicates the charge-discharge curve of RGO paper at 100 mA $g^{-1}$ and 712 indicates the charge-discharge curve of RGO paper at 250 mA $g^{-1}$. The charge-discharge curves of both RGO and $MnO_2$/RGO papers show negligible IR (internal resistance) drop which indicates their low equivalent series resistance (ESR). Additionally, the curves of both samples are symmetric and include relatively straight lines. The electrical conductivities measured using four point probe were found to be 565±26 and 532±137 S $m^{-1}$ for RGO and $MnO_2$/RGO, respectively. The presence of about 20 wt % $MnO_2$ nanoparticles on RGO sheets does not cause conductivity degradation but, resulted in the larger variation of conductivity values across the hybrid paper. The conductivity obtained is comparable to most other chemical reduced free-standing graphene papers reported in the literature (typically 200-700 S $m^{-1}$).

Figure 7C:
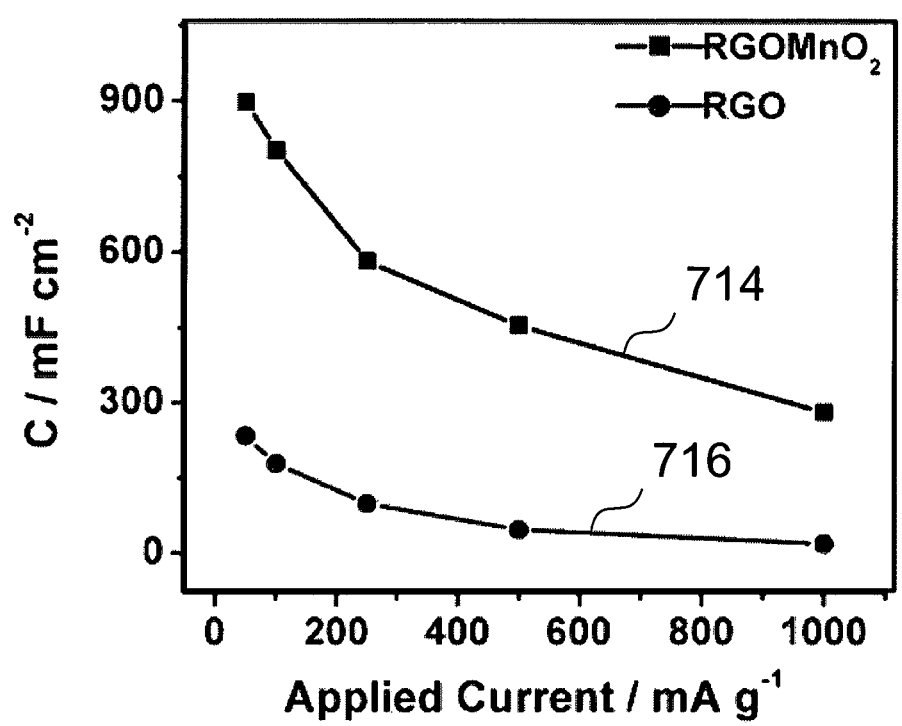
FIG. 7C shows the areal capacitance ($mF^{-2}$) of $MnO_2$/RGO and RGO papers against applied current densities (mA $g^{-1}$).

FIG. 7C shows the areal capacitance (mF $cm^{-2}$) of $MnO_2$/RGO and RGO papers against applied current densities (mA $g^{-1}$). 714 shows the variation of areal capacitance for $MnO_2$/RGO paper while 716 shows the variation of areal capacitance for $MnO_2$/RGO paper. The areal capacitance of $MnO_2$/RGO paper at 100 mA $g^{-1}$ is about 802 mF $cm^{-2}$ (specific capacitance $C_{sp}$—217 F $g^{-1}$). When the applied current increases to 500 mA g$^{-1}$, the areal capacitance of the MnO$_2$/RGO paper reduces to 454 mF cm$^{-2}$. The areal capacitance of MnO$_2$/RGO paper can be as high as 897 mF cm$^{-2}$ (specific capacitance $C_{sp}$—243 F g$^{-1}$) when the applied current density further reduces to 50 mA g$^1$.

The areal capacitance of MnO$_2$/RGO paper is relatively higher as compared to other flexible MnO$_2$/carbon based hybrid flexible electrodes and other carbon based electrodes reported up to date. This improvement may be mainly attributed to the well separated RGO sheets decorated with MnO$_2$ nanoparticles that facilitates more accessible areas for the electrolyte ions as well as wrinkled and curves surface features of MnO$_2$/RGO paper that provide more accessible surface area between the electrolyte and electrode material. In addition, this structure also allows an easy and relatively fast penetration of the electrolyte ions. Because of that, MnO$_2$/RGO paper reported in this work can be fabricated with higher areal mass than the average mass of the free standing graphene based electrode reported in the literature without suffering the dramatic drop of the gravimetric or areal capacitance when the paper electrodes are prepared using high areal mass.

On the other hand, the pristine RGO paper shows much lower areal capacitance as compared to MnO$_2$/RGO paper. The areal capacitance of RGO paper of the similar mass at 50 and 100 mA g$^{-1}$ is about 234 mF cm$^{-2}$ (specific capacitance $C_{sp}$—67 F g$^{-1}$) and 179 mF cm$^{-2}$ (specific capacitance $C_{sp}$—51 F g$^{-1}$), respectively. The areal capacitance can be as low as 47 mF cm$^{-2}$ when the applied current is increased up to 500 mA g$^{-1}$. Therefore, incorporation of pseudocapacitive material MnO$_2$ is important to improve the capacitive performance of RGO based paper electrode.

Figure 8A:
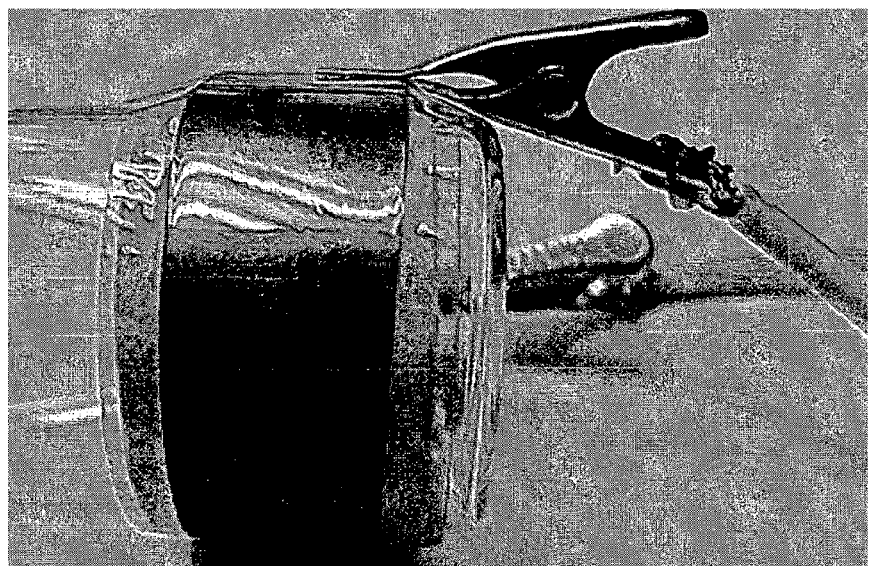
FIG. 8A shows the device in its bent state.
Figure 8B:
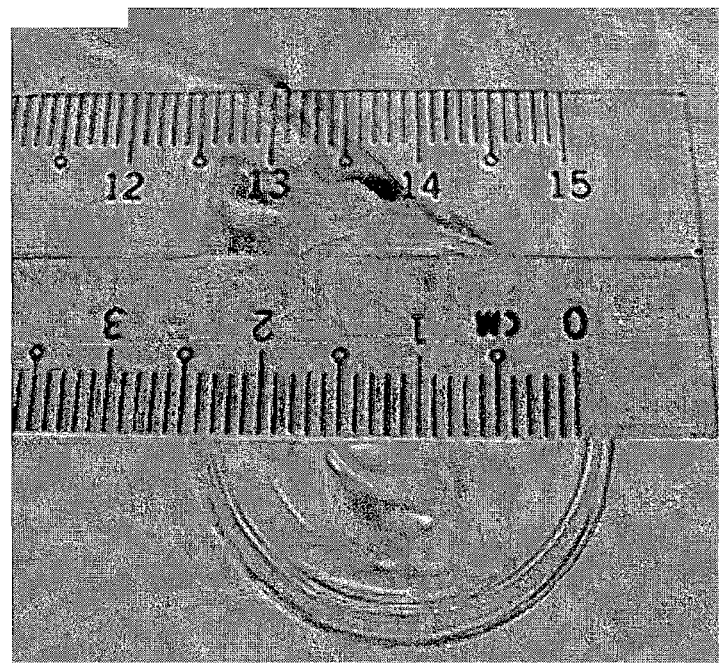
FIG. 8B shows the bending radius of the device being measured.

A prototype asymmetric supercapacitor device has also been fabricated with MnO$_2$/RGO paper and RGO paper as the positive and negative electrodes. Asymmetric configuration is chosen as it offers wider operating potential window, thus providing higher energy density. Electrochemical tests of asymmetric device with electrode size of 3 cm×1 cm each were performed between 0 and 1.5 V. The device was tested in flat and bent state with a bending radius of 1.2 cm. FIG. 8A shows the device in its bent state. FIG. 8B shows the bending radius of the device being measured.

Figure 8C:
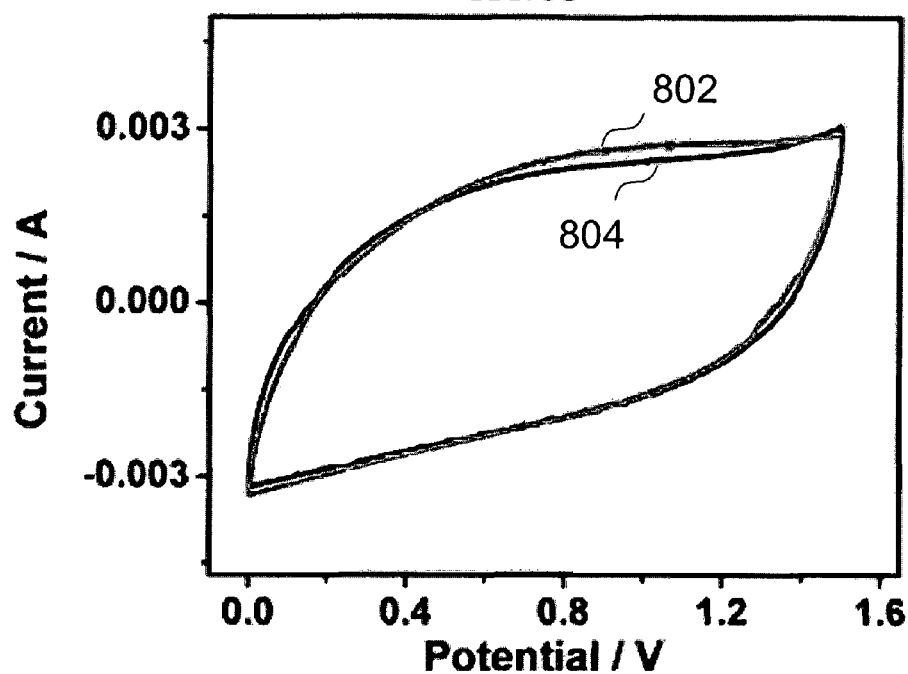
FIG. 8C shows the cyclic voltammograms (current (A) against potential (V)) of the super capacitor device with $MnO_2$/RGO paper and RGO paper as the positive and negative electrodes under normal flat and bending conditions at 10 mV $s^{-1}$.

FIG. 8C shows the cyclic voltammograms (current (A) against potential (V)) of the super capacitor device with MnO$_2$/RGO paper and RGO paper as the positive and negative electrodes under normal flat and bending conditions at 10 mV s$^{-1}$. 802 shows the voltammogram of the device when the device is in the normal flat state while 804 shows the voltammogram of the device when the device is in the bent state. It is found that bending exerts negligible effect on the capacitive behavior of asymmetric device as voltammograms of the device in both bent and flat states display almost the same quasirectangular shape.

Figure 8D:
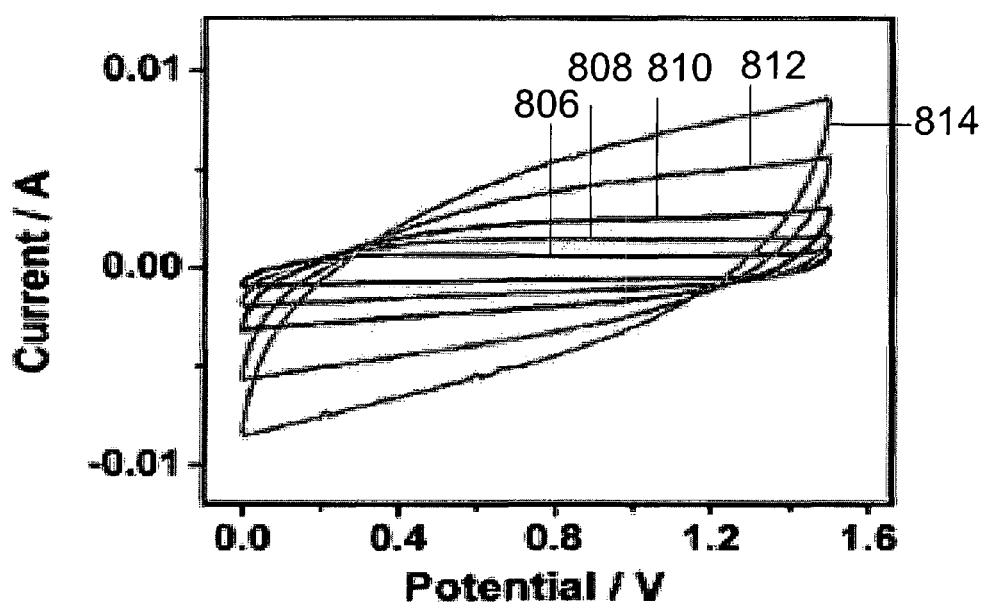
FIG. 8D shows the cyclic voltammograms (current (A) against potential (V)) of the super capacitor device in its bent state under different scan rates.

Further cyclic voltammetry tests of the device performed in its bent state under different scan rates. FIG. 8D shows the cyclic voltammograms (current (A) against potential (V)) of the super capacitor device in its bent state under different scan rates. 806 shows the voltammogam of the device under a scan rate of 2 mV s$^{-1}$, 808 shows the voltammogram of the device under a scan rate of 5 mV s$^{-1}$, 810 shows the voltammogram of the device under a scan rate of 10 mV s$^{-1}$, 812 shows the voltammogram of the device under a scan rate of 25 mV s$^{-1}$ and 814 shows the voltammogram of the device under a scan rate of 50 mV s$^{-1}$. The bent device exhibits quasirectangular shape at all scan rates, suggesting the good capacitance characteristic of the device even at its bending state.

Figure 8E:
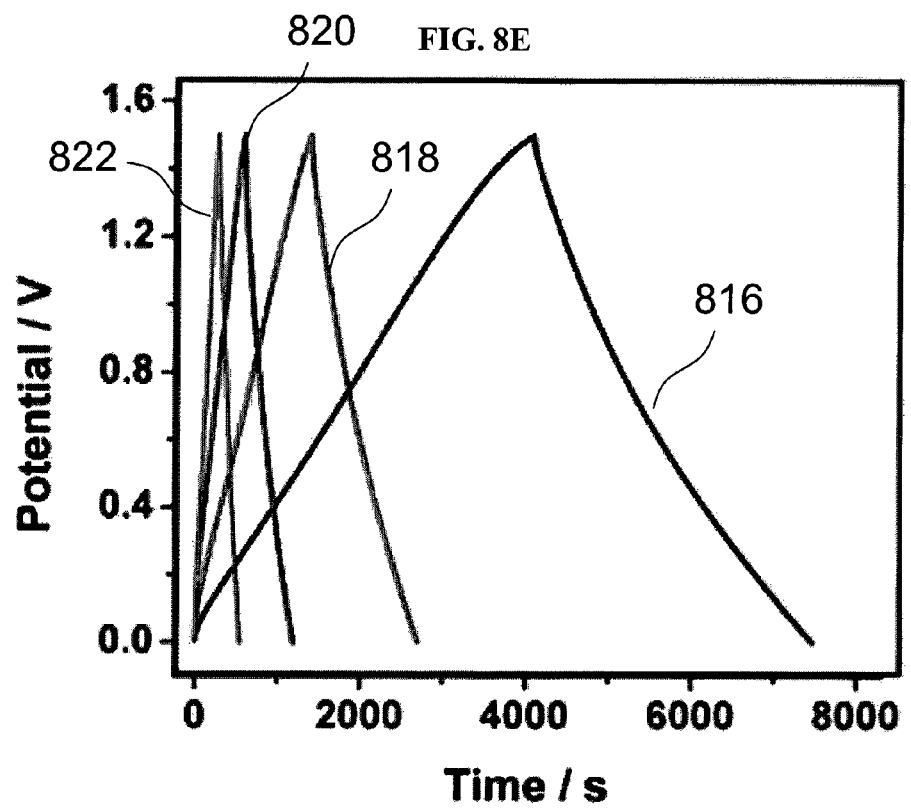
FIG. 8E shows the charge discharge curves (potential (V) against time (s)) of the bent device at different applied current.

FIG. 8E shows the charge discharge curves (potential (V) against time (s)) of the bent device at different applied currents. 816 indicates the charge-discharge curve of the bent device at 10 mA g$^{-1}$, 818 indicates the charge-discharge curve of the bent device at 25 mA g$^{-1}$, 820 indicates the charge-discharge curve of the bent device at 50 mA g$^{-1}$ and 822 indicates the charge-discharge curve of the bent device at 100 mA g$^{-1}$. Each charge-discharge curve displays a straight line and symmetric curve within a 1.5 V potential window.

Figure 8F:
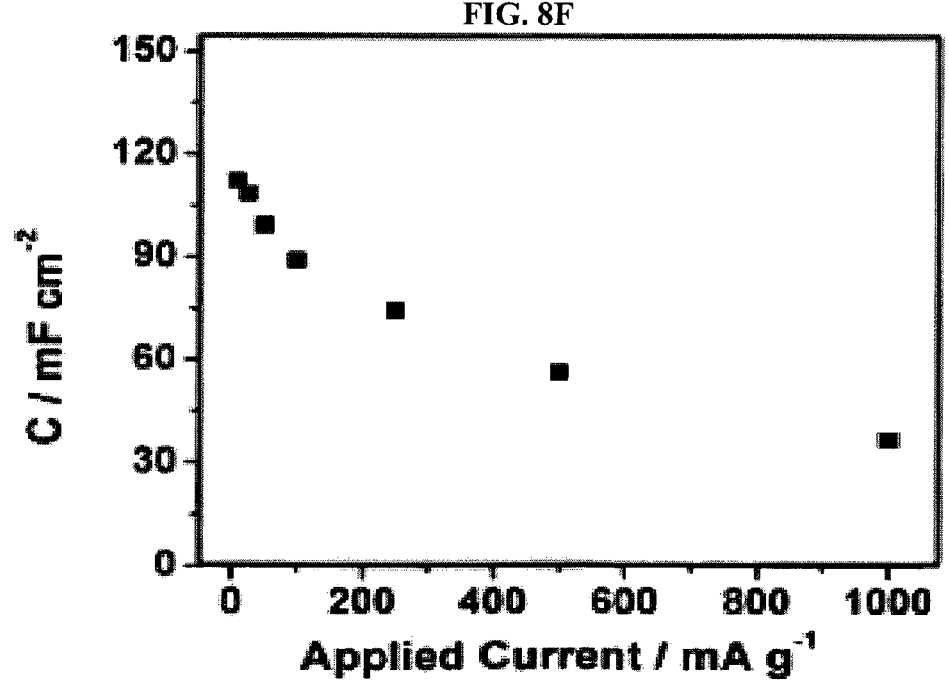
FIG. 8F shows a graph of areal capacitance ($mF^{-2}$) of the bent device against applied current densities (mA $g^{-1}$).

FIG. 8F shows a graph of areal capacitance (m F$^{-2}$) of the bent device against applied current densities (mA g$^{-1}$). The areal capacitance of the bent asymmetric device with active mass of 15 mg at 100 mA g$^{-1}$ is about 90.5 mF cm$^{-2}$ (0.27 F). The areal capacitance can be as high as 113 mF cm$^{-2}$ (0.34 F) when the applied current density reduces to 10 mA g$^{-1}$. The areal capacitance of the bent device is relatively higher as compared to other graphene paper electrodes tested in similar testing configuration without bending, indicating good mechanical robustness of our device and the advantage of incorporating pseudocapacitive MnO$_2$ into graphene paper.

Figure 8G:
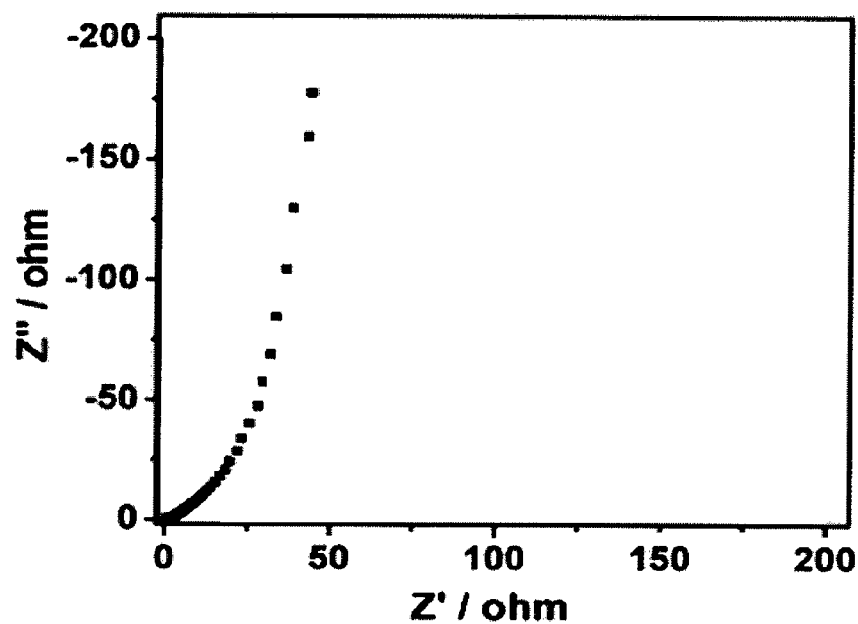
FIG. 8G shows a Nyquist plot of the bent device.
Figure 8H:
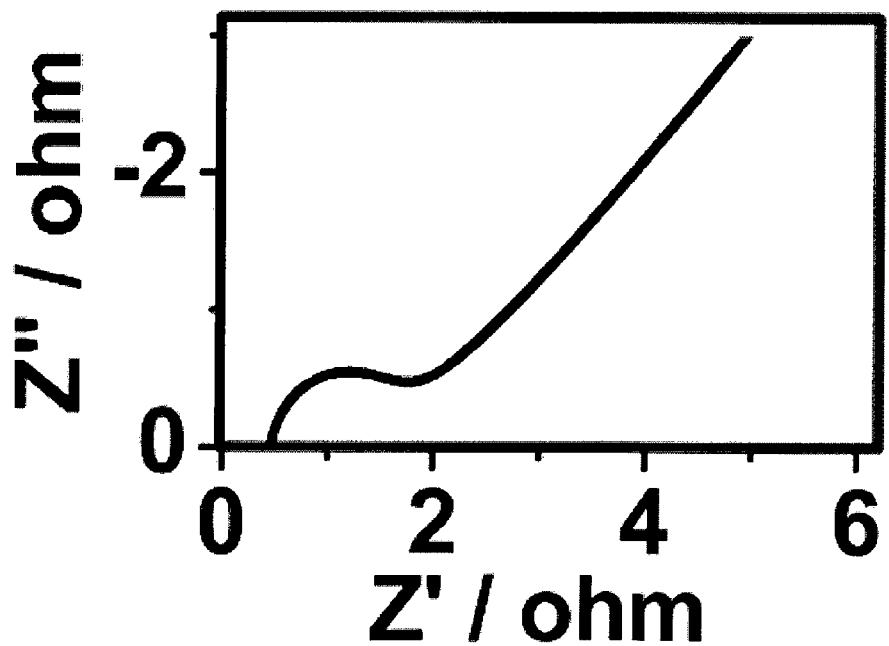
FIG. 8H shows an enlarged scale of the Nyquist plot in FIG. 8G at high frequency range measurement.

In addition, electrochemical impedance (EIS) spectroscopy measurement of the bent device was performed in order to understand the relationship between capacitive properties and electronic as well as ionic resistance of the device. FIG. 8G shows a Nyquist plot of the bent device. FIG. 8H shows an enlarged scale of the Nyquist plot in FIG. 8G at high frequency range measurement. At high frequency region, the low intercept at Z real axis (0.46Ω) is related to the low equivalent series resistance (ESR) of the device. At low frequency region, impedance characteristic is related to the diffusion of electrolyte ions into the active materials. For ideal capacitive behavior, the plot in low frequency region should be parallel to imaginary Z axis forming a 90° slope. Experimental slope is closer to 90° which indicates a predominantly capacitive behavior of the bent asymmetric device.

Figure 8I:
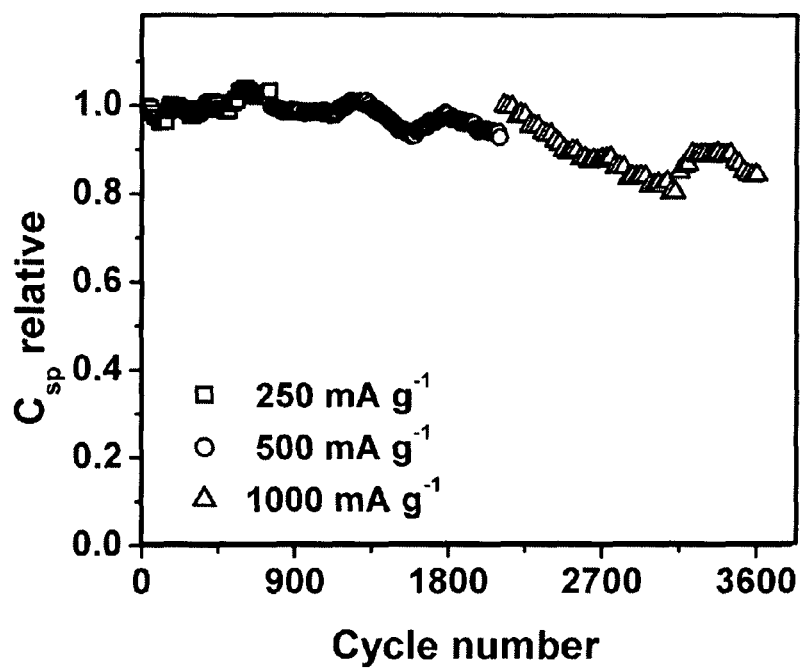
FIG. 8I shows the cycling stability performance of the bent device at three different applied currents (250 mA $g^{-1}$, 500 mA $g^{-1}$, 1000 mA $g^{-1}$).

Electrochemical stability of the bent asymmetric device was examined under continuous charge-discharge test at three different applied currents for 3600 cycles. FIG. 8I shows the cycling stability performance of the bent device at three different applied currents (250 mA g$^{-1}$, 500 mA g$^{-1}$, 1000 mA g$^{-1}$). FIG. 8I plots the relative specific capacitance ($C_{sp}$ relative) against the cycle number.

The first 750 cycles were performed at applied current of 250 mA g$^{-1}$ (≈3.75 mA). There is almost no degradation of the capacitance observed and capacitance remains unchanged until the end of 750 cycles. The next 1350 cycles were done at 500 mA g$^{-1}$ (≈7.5 mA). The bent device is able to retain 93% of its capacitance at the end of this cycling test, indicating a good stability of the bent device. The last stage of the cycling test was done at much higher applied current (1000 mA g$^{-1}$≈15 mA) for 1500 cycles. The bent device is able to retain 84% of its capacitance. The stability performance of our device is better than low areal mass freestanding graphene/MnO$_2$ paper which showed 26% degradation of $C_{sp}$ after 1000 cycling test in flat condition. Furthermore, it is also comparable to carbon nanoparticles/MnO$_2$ on flexible carbon fabric electrode that was tested in the bent condition for 1000 cycles.

Figure 8J:
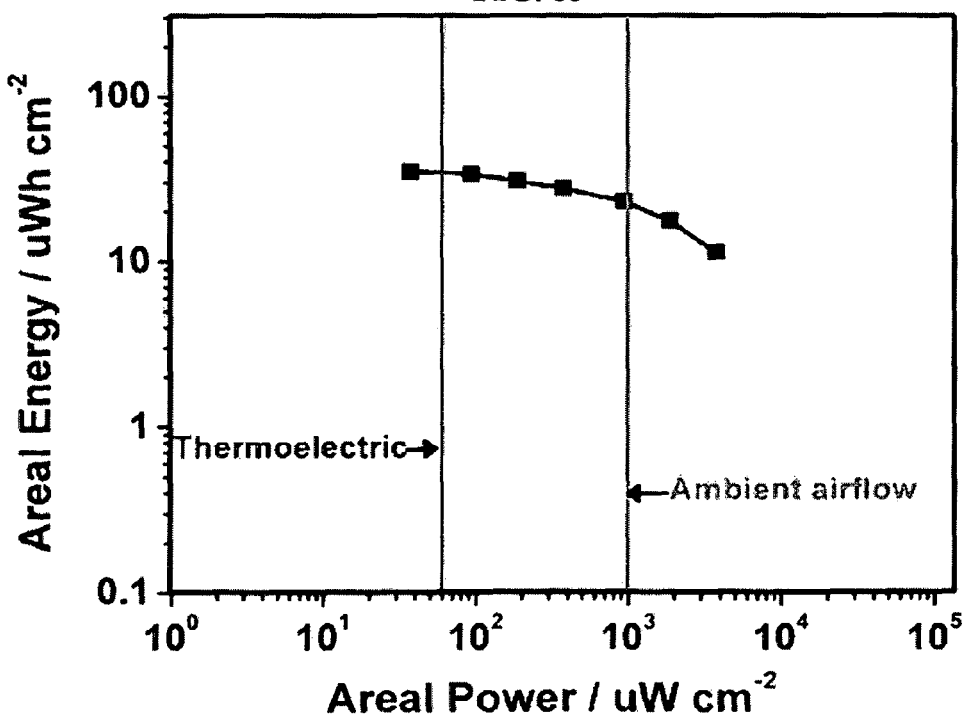
FIG. 8J plots the areal energy density ($\mu W$ h $cm^{-2}$) against areal power density ($\mu W$ $cm^{-2}$) of the bent device under different applied currents.

FIG. 8J plots the areal energy density (μW h cm$^{-2}$) against areal power density (μW cm$^{-2}$) of the bent device under different applied currents. Requirements of two applications, i.e. storing electrical power generated from thermoelectric and ambient air flow are also indicated in FIG. 8J. Areal power density as high as 3.8 mW cm$^{-2}$ can be achieved at applied current of 1000 mA g$^{-1}$ with energy density of 11.5 µW h cm$^{-2}$. The bent device is able to possess a maximum of 35.1 µW h cm$^{-2}$ areal energy at lower areal power of 37.5 µW cm$^{-2}$. These performances are able to meet requirement of certain applications such as storing electrical power generated from thermoelectric and ambient airflow as indicated in FIG. 8J or other applications such as powering radio frequency identification tags (RFID) that typically need power in the range of 1-100 µW.

Figure 8K:
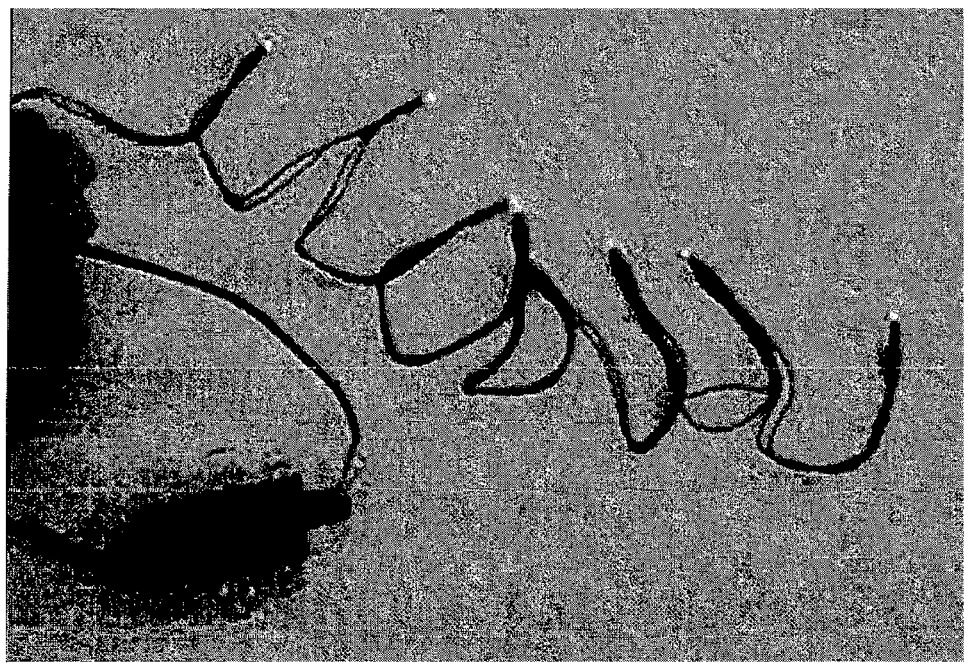
FIG. 8K shows an image of 8 LED lights being powered by one asymmetric supercapacitor device.

Furthermore, in order to demonstrate the real application of our asymmetric supercapacitor device, the device was used to power 8 bulbs of light emitting diode (LED) decorating lights which normally require two AA batteries as power supply. FIG. 8K shows an image of 8 LED lights being powered by one asymmetric supercapacitor device. After charging one unit of asymmetric device, the device could power 8 LED lights for at least 25 s.

Vanadium (V) Oxide/Reduced Graphene Oxide (V$_2$O$_5$/RGO or VGO)

Pre-oxidized graphite oxide was prepared via a modified Hummers method. P$_2$O$_5$ (10 g) and K$_2$S$_2$O$_8$ (10 g) were added to concentrated H$_2$SO$_4$ (30 mL) and graphite flakes (20 g) with stirring at 80° C. for 6 h. The mixture was cooled and diluted with DI water before undergoing vacuum filtration and dried at room temperature. The pre-oxidized graphite oxide (3 g) and KMnO$_4$ (9 g) were added to concentrated H$_2$SO$_4$ (69 mL) while keeping the temperature below 20° C. The content was heated to 40° C. and stirred for 2 h. DI water (350 mL) and H$_2$O$_2$ (7.5 mL) were added into the mixture and aged overnight to allow graphite oxide to settle. To obtain graphene oxide, 7.5 ml of the graphite oxide was diluted with DI water (15 mL) and washed via centrifuge with 1:10 HCl solution several times. The content was then diluted with DI water and subjected to several hours of ultrasonication to exfoliate the graphite oxide.

90 mg of ammonium metavanadate (NH$_4$VO$_3$) was added to GO for further ultrasonication for 30 minutes. 5 M HNO$_3$ was then added to adjust the pH to 2, and allowed to stir at 85° C. for 1 hour. The solution was then filtered via vacuum filtration using a 0.025 µm pore nitrocellulose membrane filter (Millipore). The film (V$_2$O$_5$/GO) was dried and peeled off from the membrane filter. The electrode size was 1×2 cm for 3-electrode tests and 1×3 cm for two electrode device test.

The electrodes were positioned inside the wall of teflon-lined autoclaves filled with 2 mL hydrazine monohydrate (Sigma) by securing them on filter paper strips (Advantec). The electrodes were reduced after placing the sealed autoclave in an oven at 85° C. for 24 hours. The V$_2$O$_5$/RGO electrodes were then dried and acid treated by soaking in HNO$_3$ solution for a few hours. The acid treated electrodes were then dried at 60° C. in air for 4 hours.

The morphology of the V$_2$O$_5$/RGO papers, i.e. V$_2$O$_5$/RGO papers, was investigated using field emission scanning electron microscopy (FESEM, JEOL-7600F). Raman spectroscopy investigations were performed using Witec confocal Raman microscopy with laser wavelength of 488 nm. X-ray photoelectron spectroscopy (XPS) analysis was carried out on a Thermo Scientific ESCALAB 250 Xi spectrometer with a monochromatized Al Kα X-ray source (1486.6 eV) at a constant dwell time of 50 ms and a pass-energy of 50 eV. Mechanical properties were obtained via Dynamic Mechanical Analysis (DMA) using TA Instruments DMA Q800. Resistivity measurements were done using a 4-point probe (Advanced Instrument Technology, CMT-SR2000N). To determine the composition of the V$_2$O$_5$ and RGO, Thermogravimetric Analysis (TGA) was done using TA Instruments Q500.

Electrochemical tests were carried out using Solartron 1470E electrochemical interface. Three electrode tests were done using Pt and Ag/AgCl (3 M KCl) as the counter and reference electrode, respectively. The free-standing electrode was used as-synthesized (1 cm×2 cm) as the working electrode, with half the electrode (2.2±0.1 mg cm$^{-2}$) immersed in the electrolyte (1 M LiClO$_4$ in Propylene Carbonate). To fabricate a prototype asymmetric supercapacitor, a two-electrode device which consists of V$_2$O$_5$/RGO as the anode and RGO as the cathode was setup. Electrolyte used was the same as three-electrode test and the electrode size was 1×3 cm each, with total mass of both working electrode at approximately 20 mg. Commercial filter paper (Advantec) was wetted via soaking in 1 M LiClO$_4$/PC prior to being utilized as separator in the device. The device was than sandwiched between two Ti foils and tested. Electrochemical Impedance Spectroscopy (EIS) was conducted at constant voltage (5 mV amplitude) with sweeping frequency from 90 kHz to 4 mHz.

Figure 9A:
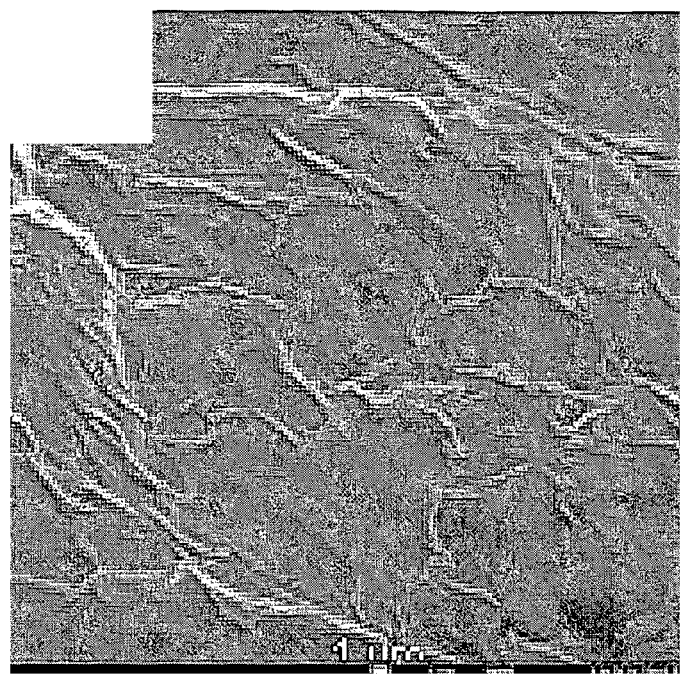
FIG. 9A shows a top view of a $V_2O_5$/RGO sheet.
Figure 9B:
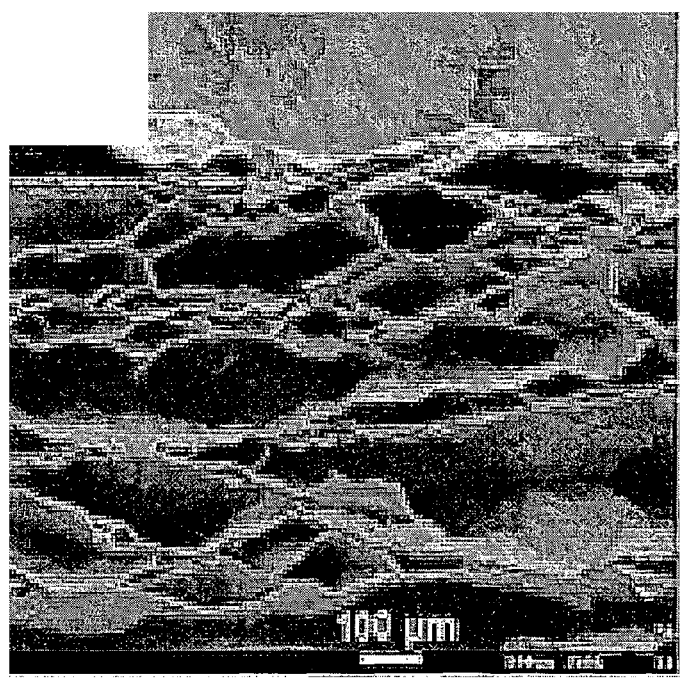
FIG. 9B shows a cross sectional view of $V_2O_5$/RGO sheets.
Figure 9C:
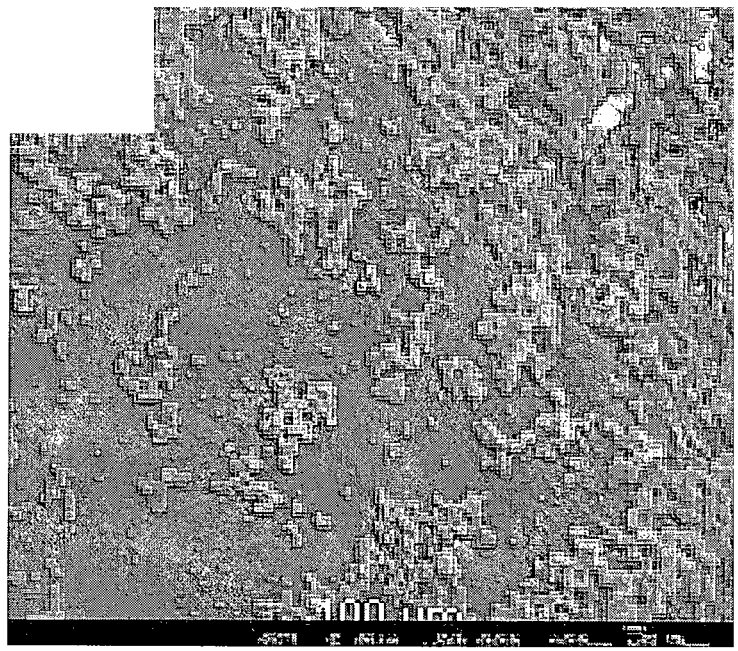
FIG. 9C shows at top view of a $V_2O_5$/RGO sheet at high magnification showing the presence of $V_2O_5$ nanoparticles.

FIG. 9A shows a top view of a V$_2$O$_5$/RGO sheet. FIG. 9B shows a cross sectional view of V$_2$O$_5$/RGO sheets. FIG. 9C shows at top view of a V$_2$O$_5$/RGO sheet at high magnification showing the presence of V$_2$O$_5$ nanoparticles. FIG. 9A reveal a wrinkled and crumpled surface, which is due to defects from the breaking of sp$^2$ bonds in the original graphite. These wrinkles also increase the accessible surface area for ion interaction from the electrolyte. FIG. 9B shows well-defined layers of the RGO sheets, indicating good exfoliation of the V$_2$O$_5$/RGO sheets. The RGO stack in the V$_2$O$_5$/RGO sample gains an increase in inter-layer spacing which leads to the stack thickness increment, demonstrating the successful exfoliation via hydrazine vapour in a high pressure environment. FIG. 9C shows the successful incorporation of V$_2$O$_5$ nanoparticles on the RGO sheets. The largest inter-layer spacing was as high as 230 µm, with the average spacing at approximately 30 µm. Such degree of exfoliation is extremely high compared to other reported works on free-standing graphene composites that usually suffer from poor exfoliation and close stacking of adjacent RGO layers. We attribute the excellent RGO layer separation of our work to the efficient hydration of the GO layers that allows the ease of hydrazine vapour in-diffusion that leads to highly reduced state of our RGO electrodes.

Figure 10A:
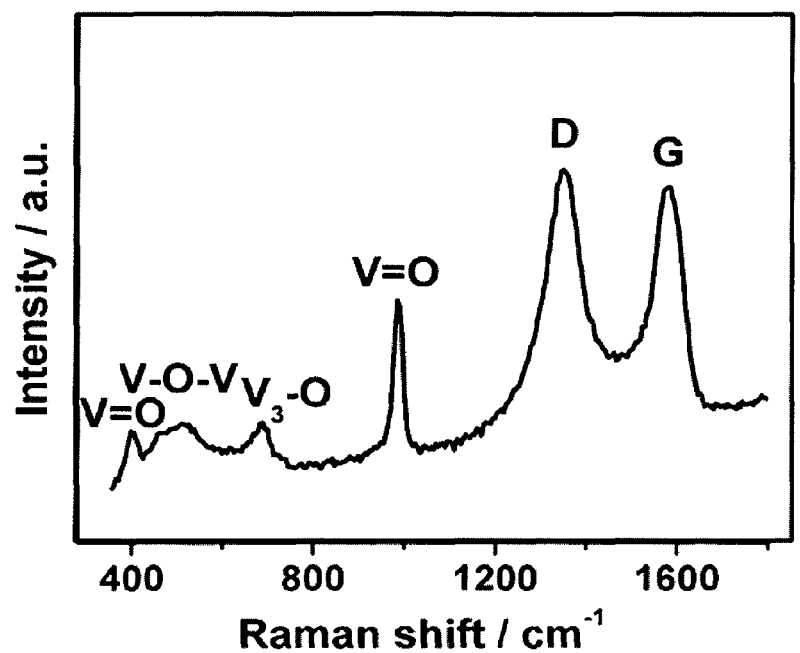
FIG. 10A shows the Raman spectra of $V_2O_5$/RGO paper measured from Raman confocal microscopy.

FIG. 10A shows the Raman spectra of V$_2$O$_5$/RGO paper measured from Raman confocal microscopy. The peaks at 1335 cm$^{-2}$ and 1585 cm$^{-1}$ in FIG. 10A corresponds to the D band and G band of graphitic carbon, respectively. The D band is characteristic of the defects and disorder in the C═C system (sp3 hybridization) due to strong oxidation from the Hummers method during synthesis of GO. The G band represents the C═C bonds (sp2 hybridization) in the system. sp2 hybridization is changed to sp3 hybridization due to the employment of the Hummers method while sp2 hybridization is restored due to hydrazine reduction. The D band intensity to the G band intensity ratio is almost equal. The Raman spectra thus reveal that the carbon lattice underwent structural changes during the synthesis of RGO.

Characteristic peaks arising from V$_2$O$_5$ can also be seen in the Raman spectra. The peaks at 285 cm$^{-1}$, 403 cm$^{-1}$, 472 cm$^{-1}$, 525 cm$^{-1}$, 687 cm$^{-1}$ and 984 cm$^{-1}$ correspond to that reported for single crystal and polycrystalline V$_2$O$_5$ films. Raman shifts at 984 cm$^{-1}$ correspond to the stretching modes of V═O. Peaks at 525 cm$^{-1}$ and 687 cm$^{-1}$ are due to the stretching and bending mode of V$_3$—O (triply coordinated oxygen), respectively. The peak at 285 cm$^{-1}$ and 403 cm$^{-1}$ are assigned to the bending vibrations of V=O, while 472 cm$^{-1}$ is due to the bending vibrations of V—O—V (bridging doubly coordinated oxygen).

Figure 10B:
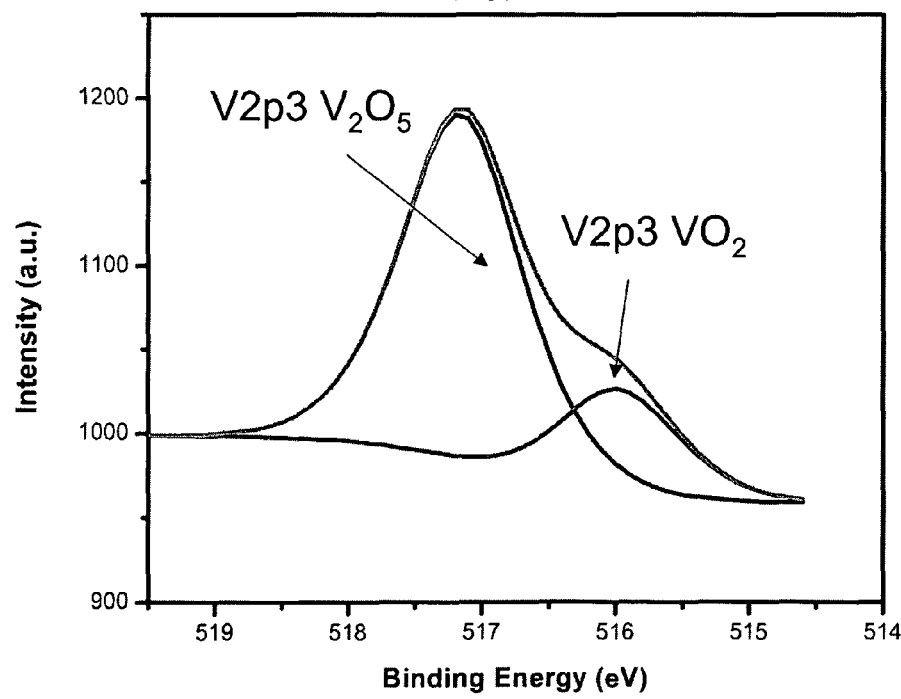
FIG. 10B shows the X-ray photoelectron spectroscopy spectra (XPS) of $V2p_{3/2}$ signal of $V_2O_5$/RGO paper.

X-ray Photoelectron Spectroscopy (XPS) was employed to further characterize the $V_2O_5$/RGO paper. FIG. 10B shows the X-ray photoelectron spectroscopy spectra (XPS) of $V2p_{3/2}$ signal of $V_2O_5$/RGO paper. The broad and asymmetric peak of $V2p_{3/2}$ at 517.1 eV ($V2p_{3/2}$) can be attributed to $V^{5+}$ in $V_2O_5$. Deconvolution of this peak reveals additional peaks at 516.0 and 517.2 eV, which corresponds to the spin-orbit splitting of $V2p_{3/2}$ in $V^{4+}$ and $V^{5+}$ respectively. However, the relative low intensity of the deconvoluted $V^{4+}$ ($VO_2$) peaks suggests that a majority of the Vanadium are of +5 oxidation state, indicating that most of the oxides present were $V_2O_5$.

Figure 10C:
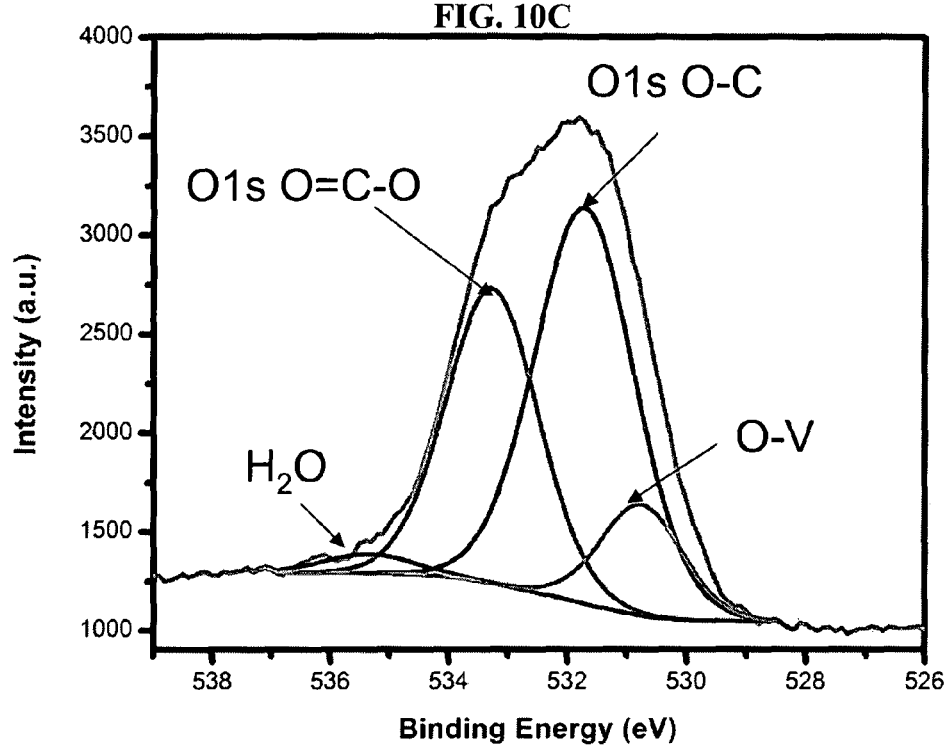
FIG. 10C shows the X-ray photoelectron spectroscopy spectra (XPS) of O1s signal of $V_2O_5$/RGO paper.

FIG. 10C shows the X-ray photoelectron spectroscopy spectra (XPS) of O1s signal of $V_2O_5$/RGO paper. The O1s spectrum centered at 532 eV can be deconvoluted into three peaks: O1s O—C peak at 531.7 eV and O1s O=C—O peak at 533.2 eV which correspond to the remaining oxygen functional groups on RGO; and V—O peak at 530.6 eV which is attributed to the oxygen ions in $V_2O_5$. The intensity of the V—O peak is a similar range as the V2p3 peaks; the peak at 535 eV is attributed to the presence of $H_2O$ molecules, indicating the highly hydrated state of our free-standing electrodes.

Figure 10D:
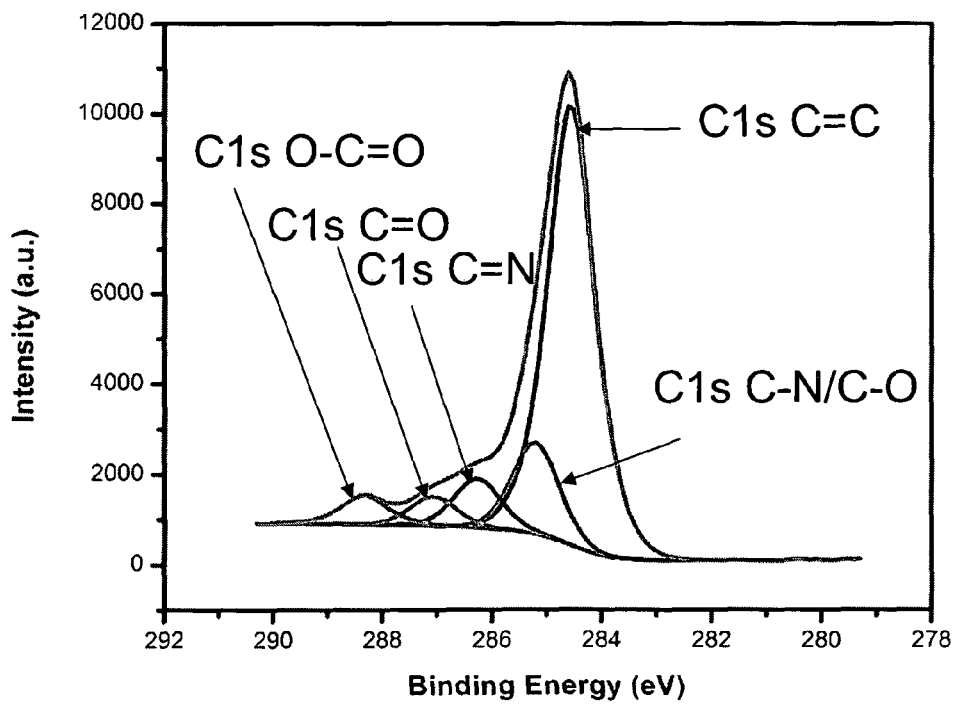
FIG. 10D shows the X-ray photoelectron spectroscopy spectra (XPS) of C1s signal of $V_2O_5$/RGO paper.

FIG. 10D shows the X-ray photoelectron spectroscopy spectra (XPS) of C1s signal of $V_2O_5$/RGO paper. The C 1s peak can be deconvoluted into 5 peaks, each indicating the different carbon bonds: C=C (284.6 eV); C—N and C—O (285.2 eV); C=N (286 eV); C=O (287 eV); O—C=O (288.2 eV). The presence of the C=N and C—N peaks are attributed to hydrazine reduction and $HNO_3$ acid treatment of the electrode. Furthermore, the peak intensities of oxygen associated groups in the C1s peak are rather low, suggesting that a good degree of reduction has taken place, where most of the oxygen functional groups from GO have been removed. The significantly higher C=C peak intensity also shows the restoration of the disrupted sp2 bonds during oxidation of graphite to GO, which is in agreement to our Raman studies, further implying the successful reduction of GO to RGO.

A low sheet resistance of 29.1Ω□$^{-1}$ is measured from the free-standing V2O5/RGO paper, which indicates that most of the GO has been successfully reduced to RGO with the restoration of the sp2 hybridization leading to improved conductivity.

Figure 11A:
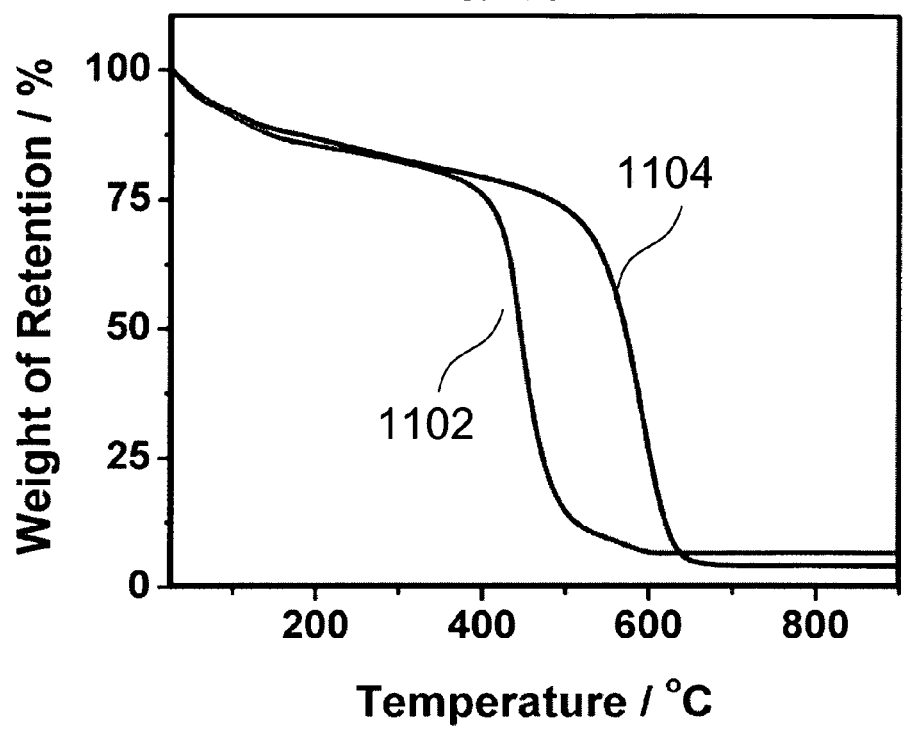
FIG. 11A is a plot of weight retention (%) against temperature (° C.) illustrating the thermogravimetric analysis of $V_2O_5$/RGO paper and RGO paper.

Thermogravimetric analysis (TGA) was done to investigate the weight percentage of $V_2O_5$ present in our free-standing composite electrodes. FIG. 11A is a plot of weight retention (%) against temperature (° C.) illustrating the thermogravimetric analysis of $V_2O_5$/RGO paper and RGO paper. For pristine RGO, the initial step loss of approximately 15% until 200° C. is due to the evaporation of adsorbed water within the RGO layers, which supports our claim of a highly hydrated RGO sheet. The subsequent gentle and gradual mass loss can be attributed to the pyrolysis of remaining labile oxygen functional groups which have not been removed during the hydrazine reduction process. The final step loss at 550° C. is due to the sublimation of the carbon backbone. This final step loss for $V_2O_5$/RGO occurs at a relatively low temperature and can be attributed to the presence of $V_2O_5$, which catalyzes the RGO combustion. From the TGA curve, the amount of $V_2O_5$ is calculated to be approximately 10 wt %.

Figure 11B:
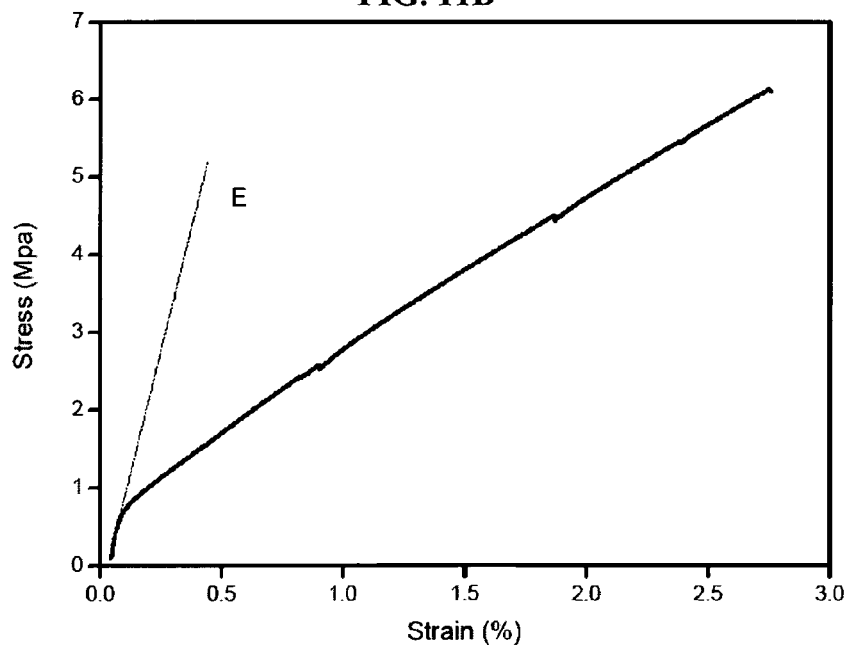
FIG. 11B is a plot of stress (MPa) against strain (%) illustrating dynamic mechanical analysis (DMA) of $V_2O_5$/RGO paper.
Figure 11C:
FIG. 11C shows a photo of a RGO/$V_2O_5$ paper bent along a round template.
Figure 11D:
FIG. 11D shows a photo of a $V_2O_5$/RGO paper bent manually by hand.

To show the good physical properties and mechanical robustness of our free-standing electrodes, dynamic mechanical analysis (DMA) was used to analyze the Young's Modulus and tensile strength. FIG. 11B is a plot of stress (MPa) against strain (%) illustrating dynamic mechanical analysis (DMA) of $V_2O_5$/RGO paper. Young's Modulus of 1.7 GPa was measured from the elastic region of the stress-strain curve, with tensile strength reaching up to 6.1 MPa. This is attributed to the ordered layer structure of the RGO that exhibits high mechanical strength in the in-plane direction, which is a characteristic of graphene due to the strong sp2 bonds between the carbon atoms. Compared to the previous work on $MnO_2$/RGO free-standing electrodes, the tensile strength seems lower but this $V_2O_5$/RGO electrode is able to sustain strain up to almost 3% of its original dimensions. This is possibly due to the highly hydrated nature of $V_2O_5$ which reduces the brittleness of the electrode, as can be seen in the lower Young's modulus and tensile strength. FIG. 11C shows a photo of a $V_2O_5$/RGO paper bent along a round template. FIG. 11D shows a photo of a $V_2O_5$/RGO paper bent manually by hand.

Electrochemical tests using a three electrode setup was used to investigate the capacitive behavior of our $V_2O_5$/RGO free-standing electrodes. The free-standing electrode was cut into a 1×2 cm$^2$ sheet and directly used as the working electrode without any current collector or support. Platinum sheet and Ag/AgCl were used as counter and reference electrodes, respectively. 1 M Lithium Perchlorate in Propylene Carbonate ($LiClO_4$/PC) was used as the electrolyte.

FIG. 12A shows the cyclic voltammograms (current density (A cm$^{-2}$) against potential (V)) of $V_2O_5$/RGO free-standing paper and RGO free-standing paper. 1202 indicates the cyclic voltammogram of $V_2O_5$/RGO free-standing paper while 1204 indicates the cyclic voltammogram of RGO free-standing paper from −0.8V to 0.8V. Cyclic voltammetry (CV) of $V_2O_5$/RGO free-standing paper showed a larger area compared to pure RGO free-standing paper, signifying the role of $V_2O_5$ in delivering pseudocapacitance. By choosing an organic electrolyte instead of an aqueous one, we are able to extend the potential range up to 1.6 V.

Galvanostatic charge-discharge tests were conducted at different current densities to investigate the specific capacitance (Csp) of the free-standing electrodes. FIG. 12B shows the charge discharge curves (potential (V) against time (s)) of both RGO and $V_2O_5$/RGO papers at different applied currents. 1206 indicates the charge-discharge curve of $V_2O_5$/RGO paper at 100 mA g$^{-1}$, 1208 indicates the charge-discharge curve of $V_2O_5$/RGO paper at 250 mA g$^{-1}$, 1210 indicates the charge-discharge curve of RGO paper at 100 mA g$^{-1}$ and 1212 indicates the charge-discharge curve of RGO paper at 250 mA g$^{-1}$.

Figure 12C:
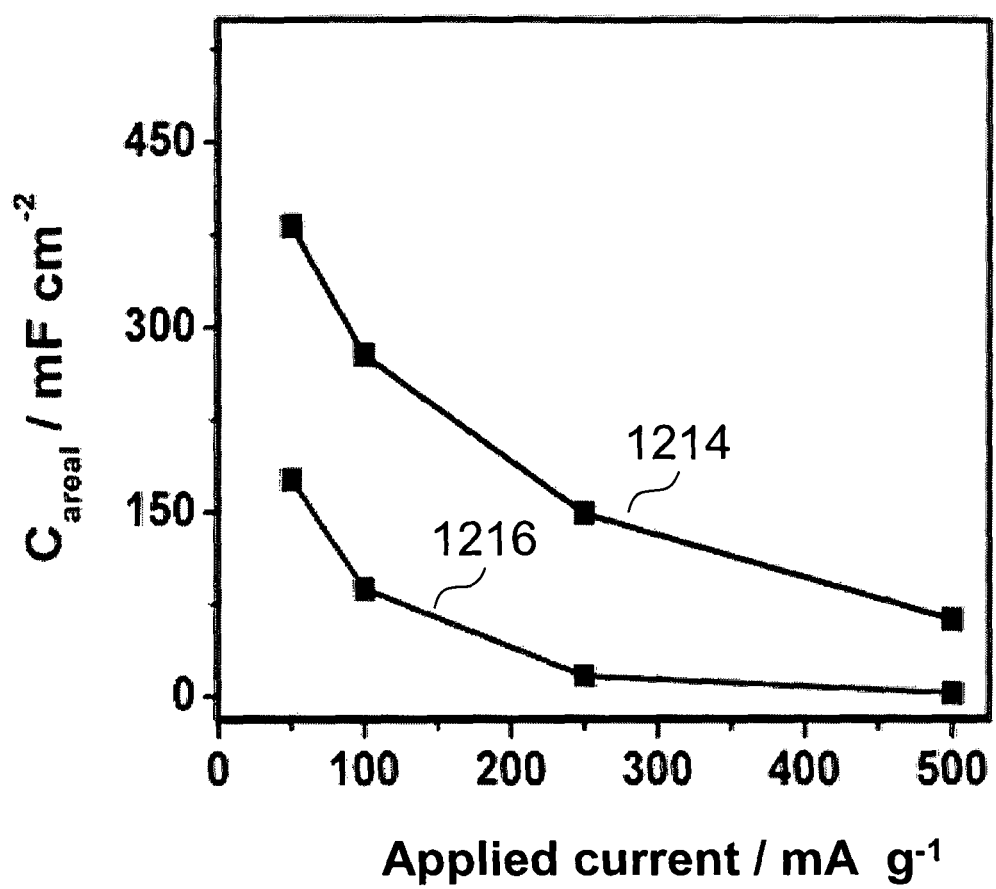
FIG. 12C shows the areal capacitance (mF $cm^{-2}$) of $V_2O_5$/RGO and RGO papers against applied current densities (mA $g^{-1}$).

FIG. 12C shows the areal capacitance (mF cm$^{-2}$) of $V_2O_5$/RGO and RGO papers against applied current densities (mA g$^{-1}$). 1214 shows the variation of areal capacitance for $V_2O_5$/RGO paper while 1216 shows the variation of areal capacitance for RGO paper. Areal capacitance was calculated based on the area of the electrode which was immersed into the electrolyte (active area). In all three-electrode tests, the active area was kept constant at 1×1 cm$^2$.

The composite $V_2O_5$/RGO electrodes achieved specific capacitance ($C_{sp}$) of up to 129.7 F g$^{-1}$ (areal capacitance— 277.8 mF cm$^{-2}$) at a current density of 0.1 A g$^{-1}$. This is much higher in comparison to the specific capacitance ($C_{sp}$) obtained by pristine RGO of similar mass at the same current density (39.05 F g$^{-1}$, 87.9 mF cm$^{-2}$). When the current density is reduced to 0.05 A g$^{-1}$, specific capacitance ($C_{sp}$)

increases to 178.5 F g$^{-1}$ (areal capacitance—382.2 mF cm$^{-2}$). In contrast, the specific capacitance (C$_{sp}$) of the pristine RGO is 78.4 F g$^{-1}$ (areal capacitance—176.6 cm$^2$)

The loading density was approximately 2.2±0.1 mg cm$^{-2}$, which is higher than other reported free-standing electrodes. For our calculations, the mass is based on the whole electrode which was immersed in the electrolyte. In some reports, the mass used for calculation of specific capacitance (C$_{sp}$) was underestimated with only the active materials taken into account (neglecting the substrate or template). Considering the high mass of our composite electrode, such a performance is outstanding compared to other reports in current literatures. The excellent exfoliation of our composite electrodes enables easy access of electrolyte ions onto the surfaces of both RGO and V$_2$O$_5$ nanoparticles which are anchored on the RGO sheets. This creates more accessible surface area for ionic interaction between the ions and active material, giving rise to enhanced Electrochemical Double-Layer Capacitance (EDLC) and pseudocapacitance.

We also employed a two-electrode device testing procedure to investigate the performance of our electrodes in an asymmetric system. i.e. a device, where V$_2$O$_5$/RGO was employed as the anode while free-standing RGO was used as the cathode. Both electrodes were cut into dimensions of 1×3 cm each and placed onto Ti foil as contacts. The total mass of both electrodes used in the fabrication of the device was approximately 20 mg, which is very high (>5 times higher) compared to other reported devices. For device testing, the potential window was further extended up to 2.5 V. The device was tested in the flat state and the bent state.

Figure 13A:
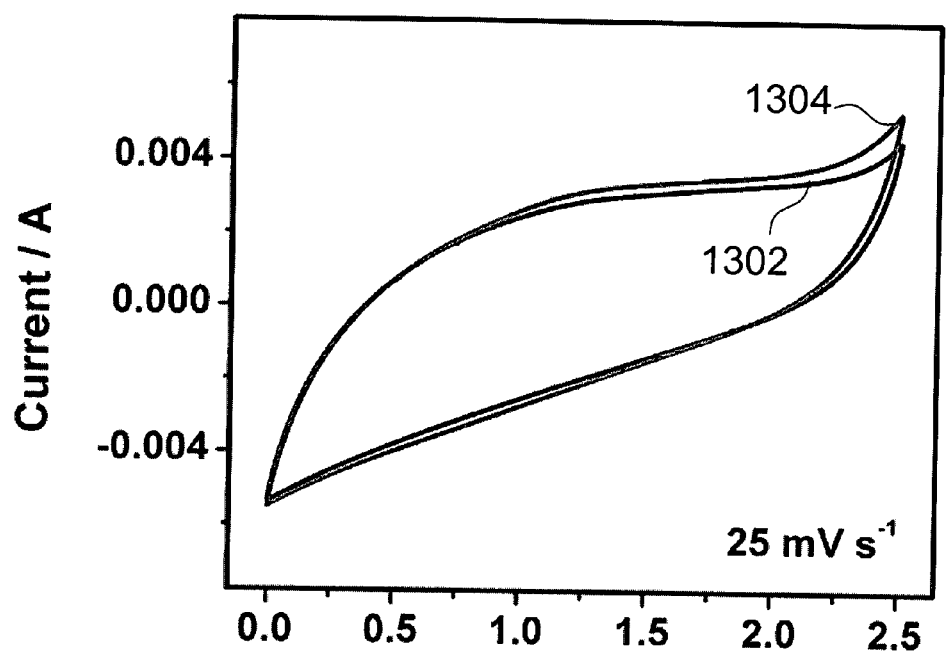
FIG. 13A shows the cyclic voltammograms (current (A) against potential (V)) of the device under normal flat and bending conditions at 25 mV $s^{-1}$.
Figure 13B:
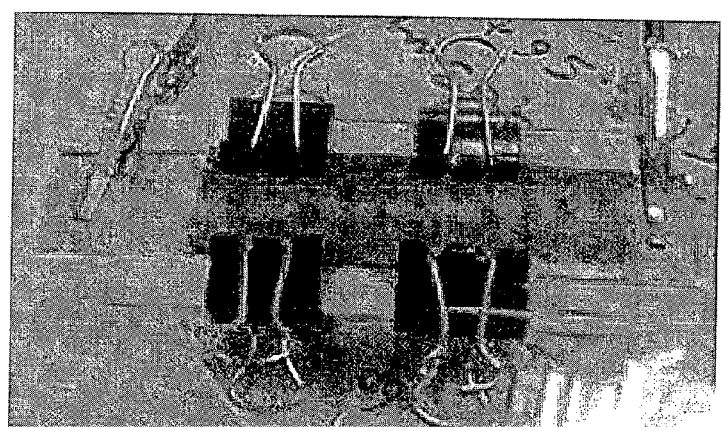
FIG. 13B shows the device been tested in the flat state.
Figure 13C:
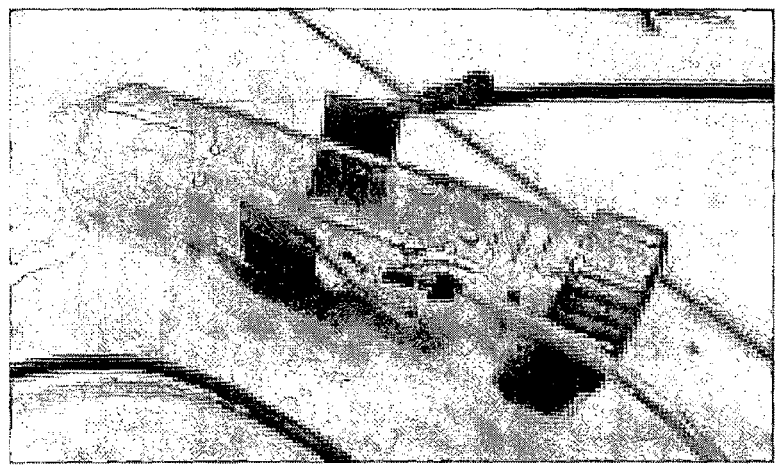
FIG. 13C shows the device being tested in the bent state.
Figure 13D:
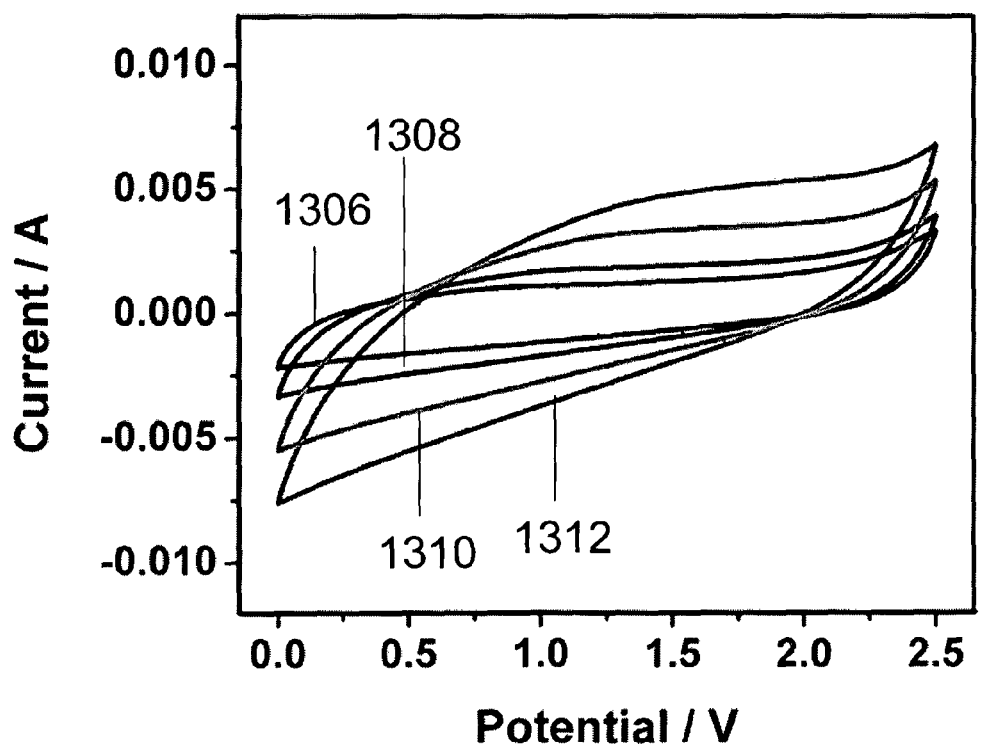
FIG. 13D shows the cyclic voltammograms (current (A) against potential (V)) of the device in its bent state under different scan rates.

FIG. 13A shows the cyclic voltammograms (current (A) against potential (V)) of the device under normal flat and bending conditions at 25 mV s$^{-1}$. 1302 shows the voltammogram of the device when the device is in the normal flat state while 1304 shows the voltammogram of the device when the device is in the bent state. Through the use of an asymmetric configuration coupled with an organic electrolyte, the potential was able to be extended to a much higher range as the absence of water eliminates the issue of water decomposition in the electrolyte, making it possible to achieve higher energy densities. FIG. 13B shows the device been tested in the flat state. FIG. 13C shows the device being tested in the bent state. The device is bent by securing the device onto a 30 mm diameter tube. The bending angle is 145°. Tests for the device in the flat state are repeated for the device in the bent state. FIG. 13A shows negligible deviation of the voltammogram of the device in the bent state from the voltammogram of the device in the flat state. This suggests good stability and capacitive behavior of the device even at the bent state. This is comparable to what others have reported about bent device tests, whereby the CV shapes had little or no deviations from CV shapes obtained when the device were in the relaxed state Further cyclic voltammetry tests of the device performed in its bent state under different scan rates. FIG. 13D shows the cyclic voltammograms (current (A) against potential (V)) of the device in its bent state under different scan rates. 1306 shows the voltammogram of the device under a scan rate of 5 mV s$^{-1}$, 1308 shows the voltammogram of the device under a scan rate of 10 mV s$^{-1}$, 1310 shows the voltammogram of the device under a scan rate of 25 mV s$^{-1}$ and 1312 shows the voltammogram of the device under a scan rate of 50 mV s$^{-1}$.

Figure 13E:
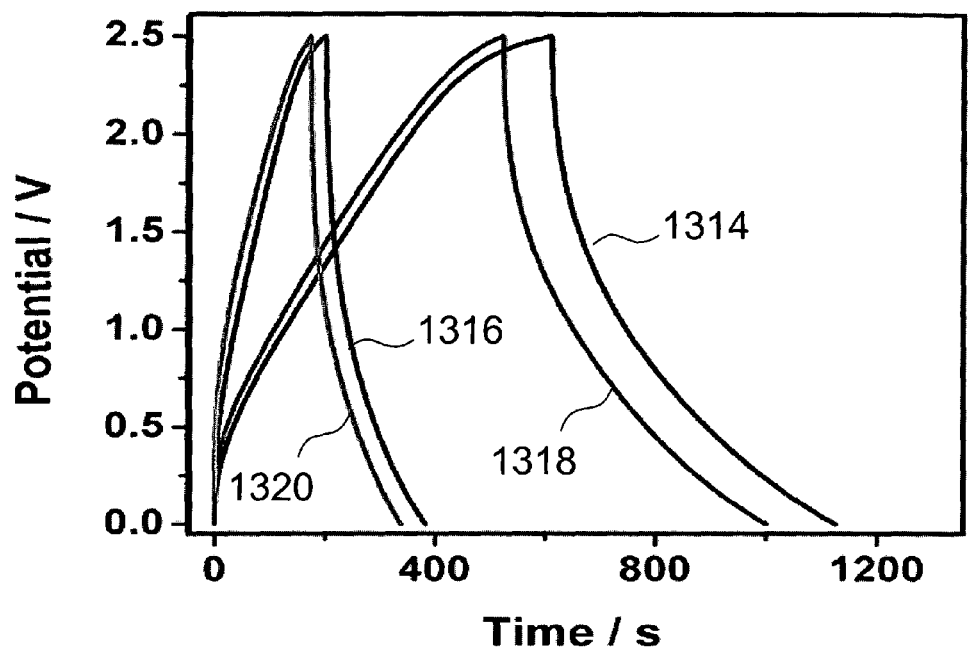
FIG. 13E shows the charge-discharge curves (potential (V) against time (s)) of the bent device as well as the flat device at different applied currents.

FIG. 13E shows the charge-discharge curves (potential (V) against time (s)) of the bent device as well as the flat device at different applied currents. 1314 indicates the charge-discharge curve of the flat device at 50 mA g$^{-1}$, 1316 indicates the charge-discharge curve of the flat device at 100 mA g$^{-1}$ and 1318 indicates the charge-discharge curve of the bent device at 50 mA g$^{-1}$ and 1320 indicates the charge-discharge curve of the bent device at 100 mA g$^{-1}$.

The charge-discharge scans in FIG. 13E reveals a specific capacitance (C$_{sp}$) of 52.5 mF cm$^{-2}$ (capacitance 157.51 mF) at current density of 0.1 A g$^{-1}$ for the device. Considering the high mass of both V$_2$O$_5$/RGO and RGO electrodes in the device (20 mg), such a capacitance value is worth highlighting. Even for carbon nanoparticles-MnO$_2$ free-standing hybrid electrodes with mass of 0.562 mg that have been reported, the total capacitance measured normalized to MnO$_2$ was 92.73 mF. Additionally, graphene-MnO$_2$ electrodes that have been reported were only able to exhibit capacitance 17.92 mF due to its very low mass of its electrodes. This highlights the importance of having a high loading mass electrode which does not impedes contact resistance but instead participate actively in the generation and/or storage or charges. This is further enhanced by the excellent exfoliation of the RGO sheets, which allows more accessible surface areas for ionic interactions. Furthermore, the extended voltage range allows increased capacitance without the issue of electrolyte decomposition, achieving higher energy density.

FIG. 13E also shows similar charge-discharge curve when the device is in the bent state and when the device is in the flat state. The bent device was able to achieve specific capacitance (Csp) of 50.6 mF cm$^{-2}$ at current density of 0.1 A g$^{-1}$, which was comparable to the performance in the flat state (52.5 mF cm$^{-2}$).

Figure 13F:
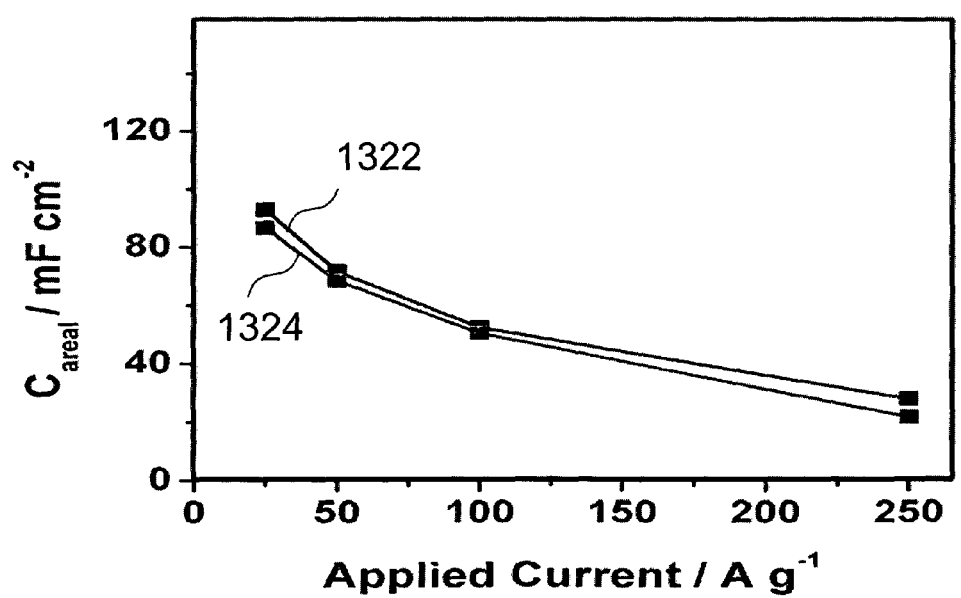
FIG. 13F shows a plot of areal capacitance (mF $cm^{-2}$) against different applied current densities (A $g^{-1}$) for the device in the flat state and the bent state.

FIG. 13F shows a plot of areal capacitance (mF cm$^{-2}$) against different applied current densities (A g$^{-1}$) for the device in the flat state and the bent state. 1322 indicates the plot for the device in the flat state while 1324 indicates the plot for the device in the bent state. The highest C$_{sp}$ achieved for the bent device was 108.7 mF cm$^{-2}$ at 0.01 A g$^{-1}$.

Figure 13G:
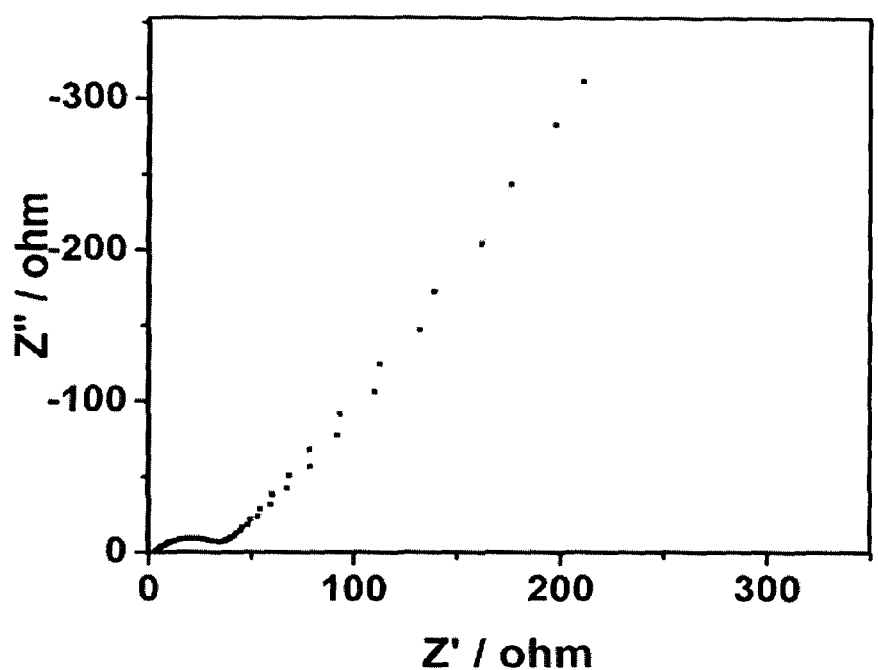
FIG. 13G shows a Nyquist plot of the bent device.
Figure 13H:
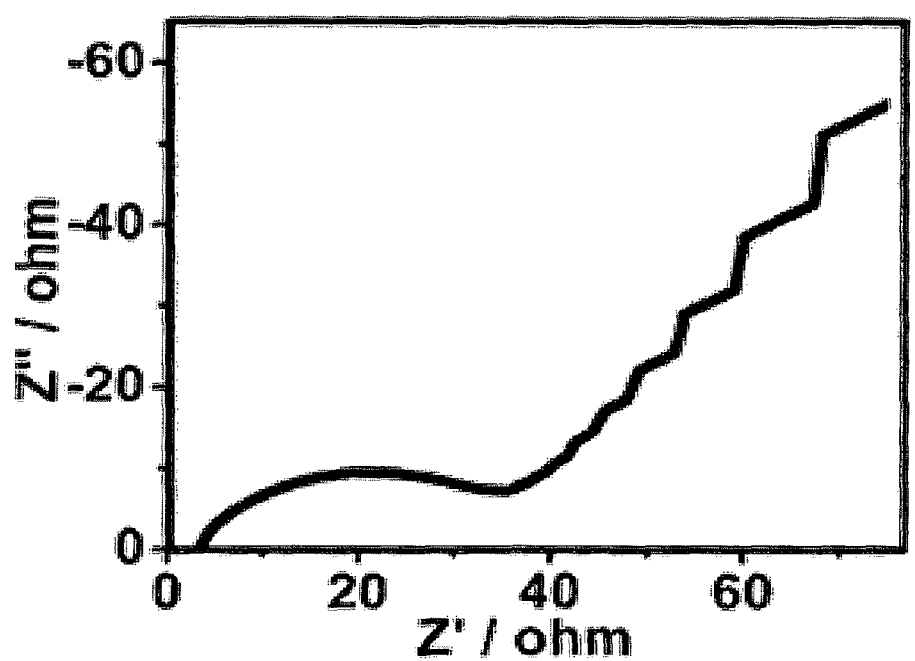
FIG. 13H shows an enlarged scale of the Nyquist plot in FIG. 13G at high frequency range measurement.

In addition, electrochemical impedance (EIS) spectroscopy measurement of the bent device was performed in order to understand the relationship between capacitive properties and electronic as well as ionic resistance of the device. FIG. 13G shows a Nyquist plot of the bent device. FIG. 13H shows an enlarged scale of the Nyquist plot in FIG. 13G at high frequency range measurement. At high frequency region, the first intercept of the curved portion of the plot on the Z real axis provides the low equivalent series resistance (ESR) of the device. The ESR was determined to be 3.36Ω. The 45° slope in the mid frequency region is typical of Warburg impedance, which is due to the frequency dependence of ion diffusion/transport in the electrolyte. A short Warburg region is indicative of short ion diffusion paths, which is evident in our case. In the low frequency region, an almost 90° slope is characteristic of capacitive behavior.

Figure 13I:
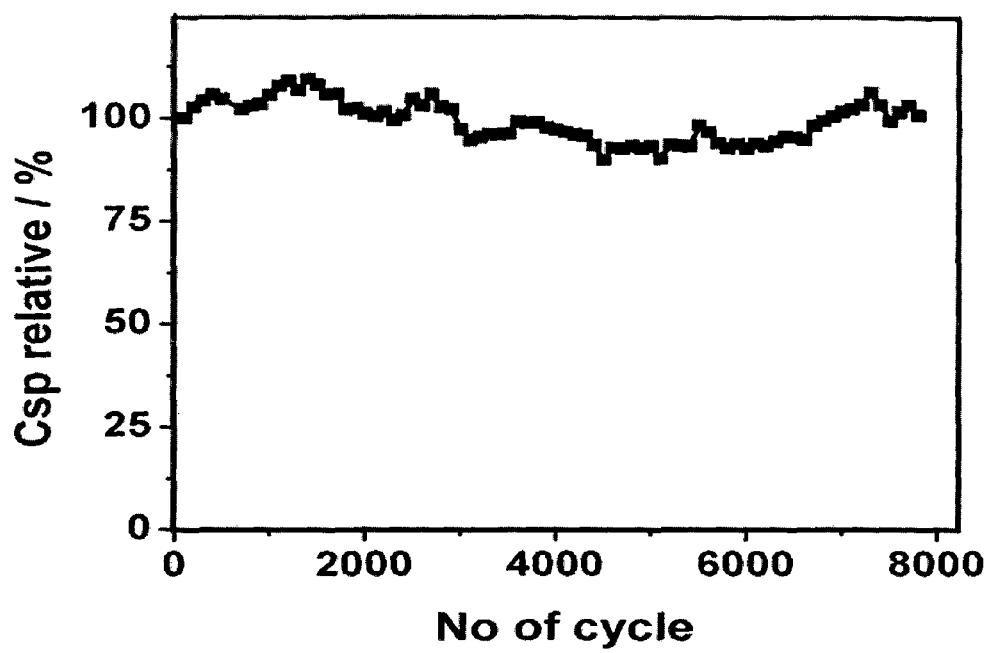
FIG. 13I shows the cycling stability performance of the bent device at 0.25 A $g^{-1}$.

To investigate the stability of the device, we subjected it to continuous charge-discharge tests for up to 8000 cycles. The cycling tests were conducted at a current density of 0.25 A g$^{-1}$. FIG. 13I shows the cycling stability performance of the bent device at 0.25 A g$^{-1}$. FIG. 13I plots the relative specific capacitance (C$_{sp}$ relative) against the cycle number.

As seen in FIG. 13I, the capacity retention does not drop below 85% for the entire duration of the stability test, which is indicative of excellent reversibility and stability of the device. A possible reason for the gradual increase in relative specific capacitance (C$_{sp}$ relative) in the first 2000 cycles could be due to the activation phase of the active materials. After reaching equilibrium, the relative specific capacitance (C$_{sp}$ relative) hovered between the 90-100% region, which shows the excellent stability of the device. Such cycling stability is superior to other reported tests, whereby the number of cycles test devices were subjected to was less than 5000, or the capacitance retention was less than 90%.

Figure 13J:
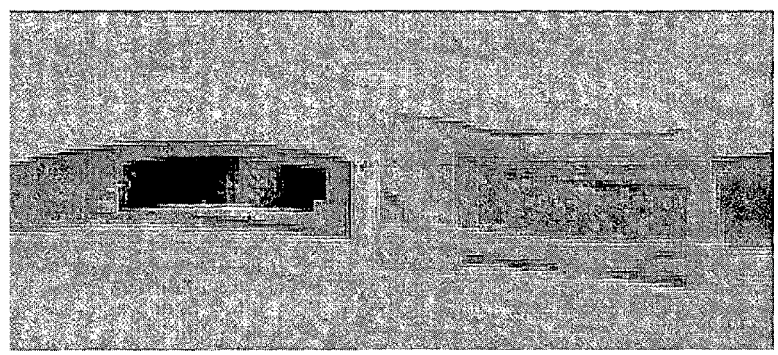
FIG. 13J shows the disassembled device after conducting the tests.

FIG. 13J shows the disassembled device after conducting the tests. The free-standing electrode did not show any sign of breakage or cracks after tests conducted in the bent state, as well as after 8000 cycles of stability tests.

Figure 13K:
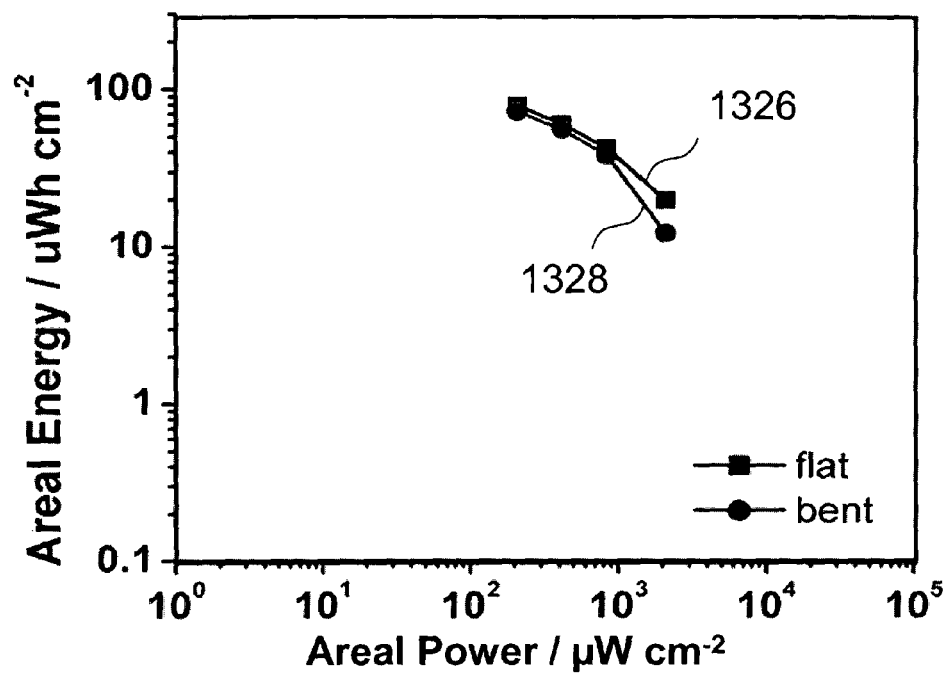
FIG. 13K plots the areal energy density ($\mu W$ h $cm^{-2}$) against areal power density ($\mu W$ $cm^{-2}$) of the device under flat and bent conditions under different applied currents.
Figure 13L:
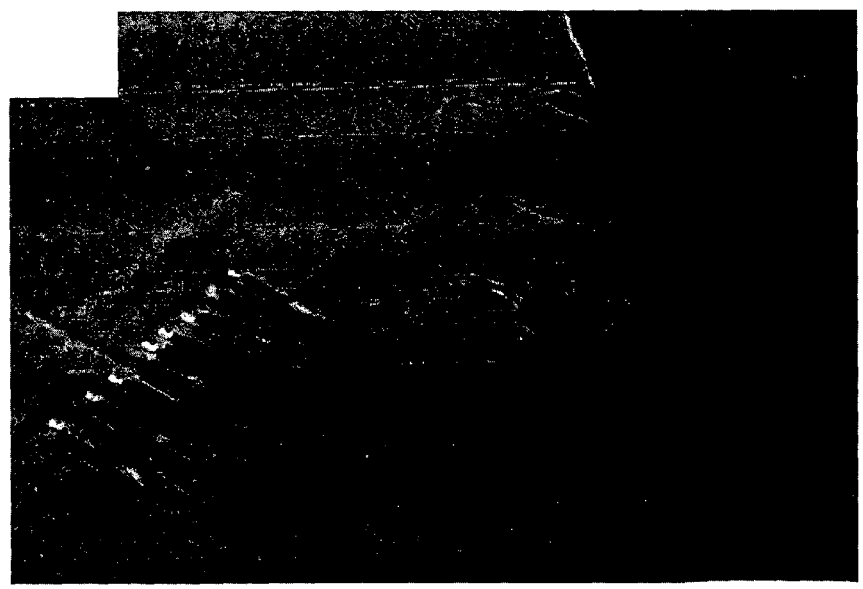
FIG. 13L shows the device being used to light up 8 LED lights.

FIG. 13K plots the areal energy density ($\mu$W h cm$^{-2}$) against areal power density ($\mu$W cm$^{-2}$) of the device under flat and bent conditions under different applied currents. In the flat state, power density as high as 625 W kg$^{-1}$ (4.17 mW cm$^{-2}$) can be achieved at 0.5 A g$^{-1}$, with an energy density of 1.22 W h kg$^{-1}$ (8.1 $\mu$W h cm$^{-2}$). The maximum energy density achievable was 13.3 W h kg$^{-1}$ (89 $\mu$W h cm$^{-2}$), with power density dropping to 12.5 W kg$^{-1}$ (0.083 mW cm$^{-2}$). In the bent state, the device is able to possess a maximum energy density of 13.6 W h kg$^{-1}$ (90.9 $\mu$W h cm$^{-2}$). These results show that our device is able to meet the requirement of commercial applications such as powering radio frequency identification (RFID) tags which require power in the range of 1-100 $\mu$W. To demonstrate the ability to power up commercial devices, we used an unit of the assembled device to light up 8 LED lights which normally requires 2 AA batteries (3 V) as power supply. FIG. 13L shows the device being used to light up 8 LED lights.

Calculations

Specific capacitance of the paper electrode tested in three electrode configuration is calculated from its discharge curve. The discharge specific capacitance (gravimetric capacitance) in F g$^{-1}$ is calculated according to this calculation:

$$C_{sp} = (I \times \Delta t)/(m \times \Delta V).$$

I is the applied current, $\Delta t$ is the discharge time, m is the mass of the paper electrode, and $\Delta V$ is the potential window of the test.

The areal capacitance of the paper electrode in F cm$^{-2}$ is calculated as the following:

$$C = (C_{sp} \times m)/A$$

A is the area of the paper electrode that immersed in the electrolyte ($\approx$1 cm$^2$).

The electrochemical measurements of an asymmetric device are calculated according to the following formulas:

$$c = I/-[\Delta V/\Delta t]$$

$$C = c/A$$

Where c is the measured capacitance of the device, I is the applied current during charge discharge test and $\Delta V/\Delta t$ is the slope of the discharge curve after iR drop. C is areal capacitance of the device in F cm$^{-2}$ and A is the footprint area of the device ($\approx$3 cm$^2$).

Calculations for the areal power and energy specifications are based on the following:

$$P_{areal} = (\Delta E \times I)/A$$

$$\Delta E = |E_{max} - E_{min}|/2$$

$$E_{areal} = (P \times \Delta t)/3600$$

Where $P_{areal}$ is the areal power in W cm$^{-2}$, I is the applied current in A, $\Delta E$ is the potential window of the test in V and A is the area of the device in cm$^{-2}$. $E_{areal}$ is areal energy in W h cm$^{-2}$ and $\Delta t$ is the discharge time in s.

Comparison

Values obtained by experiments are compared to the values reported in literature cited below.

| Material/Reference | Mass (mg) | Capacitance (mF cm$^{-2}$) | Capacitance (F g$^{-1}$) | Ref |
|---|---|---|---|---|
| Graphene Paper (Free-standing) | | | | |
| Graphene-Cellulose Paper Flexible Supercapacitors | — | 81 | 120 | 6 |
| Fexible Pillared Graphene-Paper Electrodes for High-Performance Electrochemical Supercapacitors | 0.41 | 56.6 | 138 | 7 |
| Facilitated Ion Transport in All-Solid-State Flexible Supercapacitors | — | — | 62.3 | 2 |
| Folded Structured Graphene Paper for High Performance Electrode Materials | — | — | 172 | 5 |
| Bioinspired Effective Prevention of Restacking in Multilayered Graphene Films: Towards the Next Generation of High-Performance Supercapacitors | 0.45 | 94.5 | 210 | 8 |
| A Leavening Strategy to Prepare Reduced Graphene Oxide Foams | — | — | 110 | 14 |
| MnO$_2$/Carbon and V$_2$O$_5$/Carbon based Paper | | | | |
| Solution-Processed Graphene/MnO$_2$ Nanostructured Textiles for High-Performance Electrochemical Capacitors | 0.3 | 94.5 | 315 | 9 |
| Flexible Graphene/MnO$_2$ Composite Papers for Supercapacitor Electrodes (free-standing) | 0.07 | 17.9 | 256 | 10 |
| High-Performance Nanostructured Supercapacitors on a Sponge | <0.1 | 0.9 | 1230 | 4 |
| Flexible Solid-State Supercapacitors Based on Carbon Nanoparticles/MnO$_2$ Nanorods Hybrid Structure | 0.562 | 109 | 165 | 1 |
| High Pseudocapacitance from Ultrathin V$_2$O$_5$ Films Electrodeposited on Self-Standing Carbon-Nanofiber Paper | — | — | 214 | 3 |
| Our work (MnO$_2$/RGO free-standing and flexible paper) | 3.7 | 897 | 243 | |
| Our work (V$_2$O$_5$/RGO free-standing and flexible | 2.2 | 382.2 | 178.5 | |

| Material/Reference | Mass (mg) | Capacitance (mF cm$^{-2}$) | Capacitance (F g$^{-1}$) | Ref |
|---|---|---|---|---|
| paper) | | | | |
| Flexible and/or carbon based Electrode | | | | |
| Origami Fabrication of Nanostructured, Three-Dimensional Devices: Electrochemical Capacitors with Carbon Electrodes | — | 0.008 | 15 | 11 |
| Fiber Supercapacitors Made of Nanowire-Fiber Hybrid Structures for Wearable/Flexible Energy Storage | — | 2 | — | 15 |
| Ultrathin Planar Graphene Supercapacitors | — | 0.9 | — | 16 |
| Ultrahigh-Power Micrometre-Sized Supercapacitors Based on Onion-Like Carbon | 2.8 × 10$^{-4}$ | 0.394 | 247 | 17 |
| Direct Laser Writing of Micro-Supercapacitors on Hydrated Graphite Oxide Film | — | 0.51 | — | 12 |
| Monolithic Carbide-Derived Carbon Films for Micro-Supercapacitors | — | 32 | — | 13 |

(1) L. Yuan, X.-H. Lu, X. Xiao, T. Zhai, J. Dai, F. Zhang, B. Hu, X. Wang, L. Gong, J. Chen, C. Hu, Y. Tong, J. Zhou, Z. L. Wang, *ACS Nano* 2011, 6, 656.

(2) B. G. Choi, J. Hong, W. H. Hong, P. T. Hammond, H. Park, *ACS Nano* 2011, 5, 7205.

(3) A. Ghosh, E. J. Ra, M. Jin, H.-K. Jeong, T. H. Kim, C. Biswas, Y. H. Lee, *Adv. Funct. Mater.* 2011, 21, 2541.

(4) W. Chen, R. B. Rakhi, L. Hu, X. Xie, Y. Cui, H. N. Alshareef, *Nano Lett.* 2011, 11, 5165.

(5) F. Liu, S. Song, D. Xue, H. Zhang, *Adv. Mater.* 2012, 24, 1089.3

(6) Z. Weng, Y. Su, D. W. Wang, F. Li, J. Du, H. M. Cheng, *Adv. Energy Mater.* 2011, 1, 917.

(7) G. Wang, X. Sun, F. Lu, H. Sun, M. Yu, W. Jiang, C. Liu, J. Lian, *Small* 2012, 8, 452.

(8) X. Yang, J. Zhu, L. Qiu, D. Li, *Adv. Mater.* 2011, 23, 2833.

(9) G. Yu, L. Hu, M. Vosgueritchian, H. Wang, X. Xie, J. R. McDonough, X. Cui, Y. Cui, Z. Bao, *Nano Lett.* 2011, 11, 2905.

(10) Z. Li, Y. Mi, X. Liu, S. Liu, S. Yang, J. Wang, *J. Mater. Chem.* 2011, 21, 14706.

(11) H. J. In, S. Kumar, Y. Shao Horn, G. Barbastathis, *Appl. Phys. Lett.* 2006, 88, 083104.

(12) W. Gao, N. Singh, L. Song, Z. Liu, A. L. M. Reddy, L. Ci, R. Vajtai, Q. Zhang, B. Wei, P. M. Ajayan, *Nat. Nanotechnol.* 2011, 6, 496.

(13) J. Chmiola, C. Largeot, P. L. Taberna, P. Simon, Y. Gogotsi, *Science* 2010, 328, 480.

(14) Z. Niu, J. Chen, H. H. Hng, J. Ma, X. Chen, *Adv. Mater.* 2012, 24, 4144.

(15) J. Bae, M. K. Song, Y. J. Park, J. M. Kim, M. Liu, Z. L. Wang, *Angew. Chem. Int. Ed.* 2011, 50, 1683.

(16) J. J. Yoo, K. Balakrishnan, J. Huang, V. Meunier, B. G. Sumpter, A. Srivastava, M. Conway, A. L. Mohana Reddy, J. Yu, R. Vajtai, P. M. Ajayan, *Nano Lett.* 2011, 11, 1423.

(17) D. Pech, M. Brunet, H. Durou, P. Huang, V. Mochalin, Y. Gogotsi, P.-L. Taberna, P. Simon, *Nat. Nanotechnol.* 2010, 5, 651.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. A method of forming a metal oxide/reduced graphene oxide composite film, the method comprising:
   providing a graphene oxide dispersion;
   adding a metal oxide to the graphene oxide dispersion to form a metal oxide/graphene oxide dispersion;

forming a metal oxide/graphene oxide film by filtering the metal oxide/graphene oxide dispersion using a directional flow directed assembly;

adhering the metal oxide/graphene oxide film on an absorbent material; and reducing the metal oxide/graphene oxide film using a reducing agent to form the metal oxide/reduced graphene oxide composite film;

wherein excess reducing agent is absorbed by the absorbent material to reach a back surface of the metal oxide/graphene oxide film, the back surface of the metal oxide/graphene oxide film being surface adhered to the absorbent material, during reduction of the metal oxide/graphene oxide film.

2. The method according to claim 1, the method further comprising:

modifying the dimensions of the metal oxide/graphene oxide film before reducing the metal oxide/graphene oxide film.

3. The method according to claim 2, wherein the dimensions of the metal oxide/graphene oxide film is modified to below 3 cm in length and below 1 cm in width.

4. The method according to claim 3, wherein reduction of the metal oxide/graphene oxide film is carried out in a vessel; and wherein the metal oxide/graphene oxide film is arranged on a wall of the vessel.

5. The method according to claim 4, wherein the metal oxide/graphene oxide film is arranged on the wall of the vessel such that the length of the metal oxide/graphene oxide film is substantially vertical.

6. The method of claim 4, wherein the film is arranged such that all sides of the metal oxide/graphene oxide film are equally exposed to the reducing agent.

7. The method according to claim 4, wherein the vessel is an autoclave.

8. The method according to claim 7, wherein the reducing agent is selected from any one of hydrazine, hydrazine hydrate, urea or a combination thereof.

9. The method according to claim 1, wherein forming the metal oxide/reduced graphene oxide composite film further comprises treating the metal oxide/reduced graphene oxide composite film with acid after reducing the metal oxide/graphene oxide composite film.

10. The method according to claim 9, wherein forming the metal oxide/reduced graphene oxide composite film further comprises drying the metal oxide/reduced graphene oxide composite film after treating the metal oxide/reduced graphene oxide composite film with acid.

11. The method according to claim 1, wherein the metal oxide is added to the graphene oxide dispersion by adding a metal oxide precursor to the graphene oxide dispersion; and wherein the metal oxide precursor is reacted in the graphene oxide dispersion to form the metal oxide.

12. The method according to claim 11, the method further comprising:

further adding an oxidizing agent to the graphene oxide dispersion; and wherein the oxidizing agent oxidizes the metal oxide precursor to form the metal oxide.

13. The method according to claim 11, wherein sonication is applied after adding the metal oxide precursor to the graphene oxide solution.

14. The method according to claim 1, wherein the metal oxide is selected from manganese oxide, vanadium oxide, cobalt oxide, nickel oxide, molybdenum oxide, ruthenium oxide, palladium oxide, chromium oxide, titanium oxide, copper oxide, iron oxide and zinc oxide.

15. The method according to claim 1, wherein providing the graphene oxide dispersion includes exfoliating graphite oxide.

16. The method according to claim 15, wherein exfoliating the graphite oxide comprises centrifuging the graphite oxide.

17. The method according to claim 15, wherein exfoliating the graphite oxide comprises applying sonication to the graphite oxide.

18. The method according to claim 1, wherein the absorbent material is filter paper.

19. The method according to claim 1, wherein reduction of the metal oxide/graphene oxide film is carried out in a vessel; and wherein the metal oxide/graphene oxide film is arranged on a wall of the vessel.

* * * * *